(12) United States Patent
Abbott et al.

(10) Patent No.: US 9,838,528 B2
(45) Date of Patent: Dec. 5, 2017

(54) VOICE AND VIDEO CALLING OVER LONG TERM EVOLUTION-BASED USER INTERFACE

(71) Applicant: Verizon Patent and Licensing Inc., Arlington, VA (US)

(72) Inventors: Martin Abbott, Flemington, NJ (US); So Young Park, Englewood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 259 days.

(21) Appl. No.: 14/336,482

(22) Filed: Jul. 21, 2014

(65) Prior Publication Data

US 2016/0021336 A1   Jan. 21, 2016

(51) Int. Cl.
| | | |
|---|---|---|
| H04N 7/14 | (2006.01) | |
| H04M 1/725 | (2006.01) | |
| H04L 29/06 | (2006.01) | |
| H04W 4/02 | (2009.01) | |

(52) U.S. Cl.
CPC .... *H04M 1/72572* (2013.01); *H04L 65/1016* (2013.01); *H04L 65/1059* (2013.01); *H04L 65/1089* (2013.01); *H04N 7/147* (2013.01); *H04M 2250/52* (2013.01); *H04W 4/02* (2013.01)

(58) Field of Classification Search
CPC ............. H04L 65/1016; H04L 65/1059; H04L 65/1089; H04M 1/72572; H04M 2250/52; H04W 4/02
See application file for complete search history.

(56) References Cited

U.S. PATENT DOCUMENTS

| | | | | |
|---|---|---|---|---|
| 9,477,374 | B1 * | 10/2016 | Snabl | ................ H04L 51/10 |
| 2007/0238448 | A1 * | 10/2007 | Gallagher | ............... H04W 4/22 |
| | | | | 455/414.2 |
| 2008/0178251 | A1 * | 7/2008 | Shin | ................ G08B 13/19621 |
| | | | | 725/141 |
| 2010/0175100 | A1 * | 7/2010 | Ogasawara | ......... H04L 12/5815 |
| | | | | 725/114 |
| 2012/0056971 | A1 * | 3/2012 | Kumar | ................ H04M 3/567 |
| | | | | 348/14.02 |
| 2012/0092438 | A1 * | 4/2012 | Guzman Suarez | ...... H04N 7/15 |
| | | | | 348/14.03 |
| 2012/0225652 | A1 * | 9/2012 | Martinez | ........... H04M 3/42374 |
| | | | | 455/435.1 |
| 2014/0192198 | A1 * | 7/2014 | Tsau | ................ H04N 21/41407 |
| | | | | 348/159 |
| 2014/0323083 | A1 * | 10/2014 | Caldwell | ............... H04M 15/41 |
| | | | | 455/406 |

* cited by examiner

*Primary Examiner* — Hemant Patel

(57) ABSTRACT

A video calling service provides a mobile device user is provided the capability to transition from a voice call to a video call within a calling session in a voice over long term evolution (VoLTE). The example video calling service offers a seamless transition of a voice call to a video call in a simplified and efficient process. In an example, a graphical user interface is provided that allows a user to select controls to provide real-time stream of video of a live scene via a rear facing camera to another user during a video call. Other examples describe the merger of individual voice calls into a merged call with the individual calls grouped as a conference call. The examples provide simplified use of a mobile device to transition voice calls to a video call in a cellular carrier's mobile network.

20 Claims, 13 Drawing Sheets

100

400

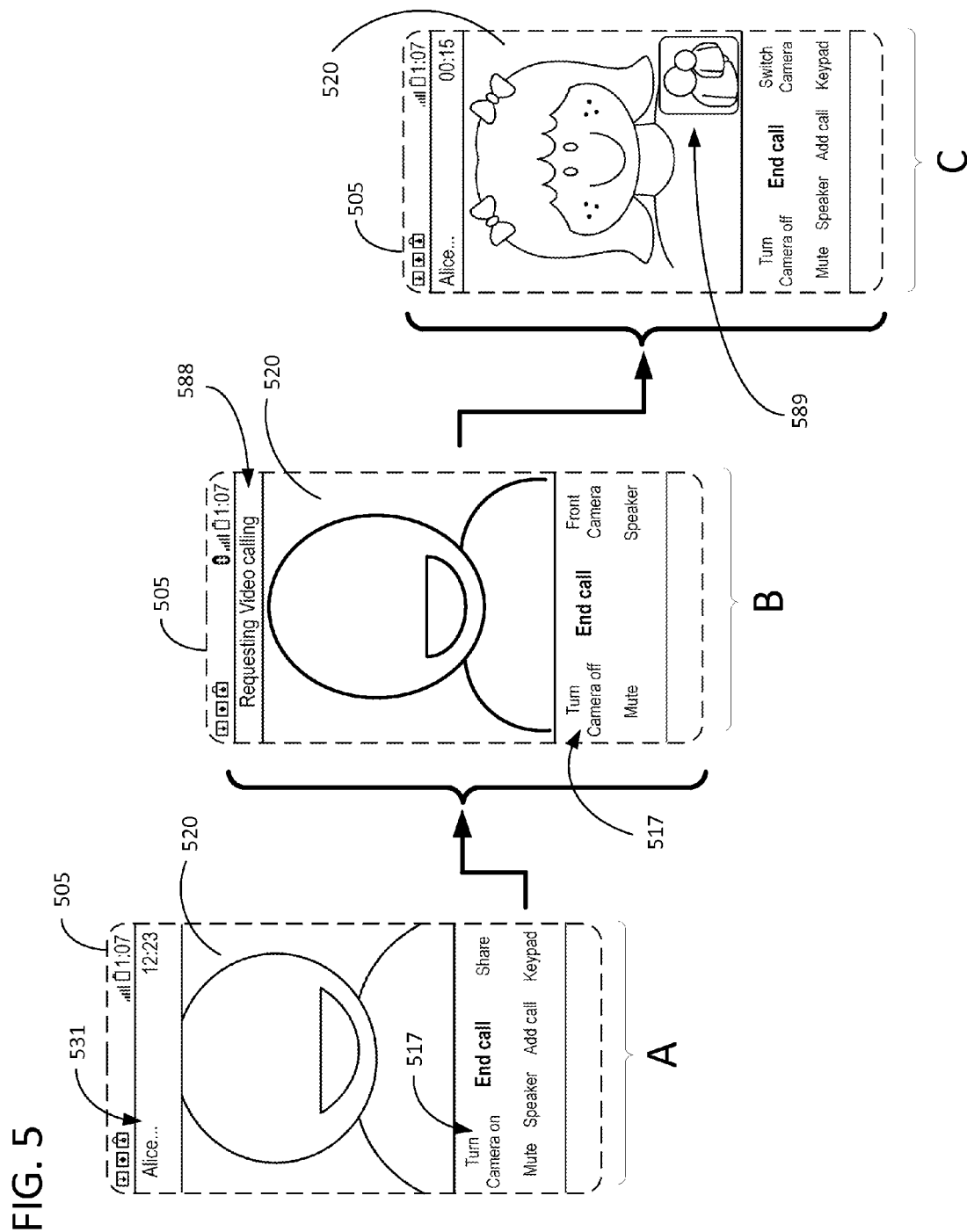

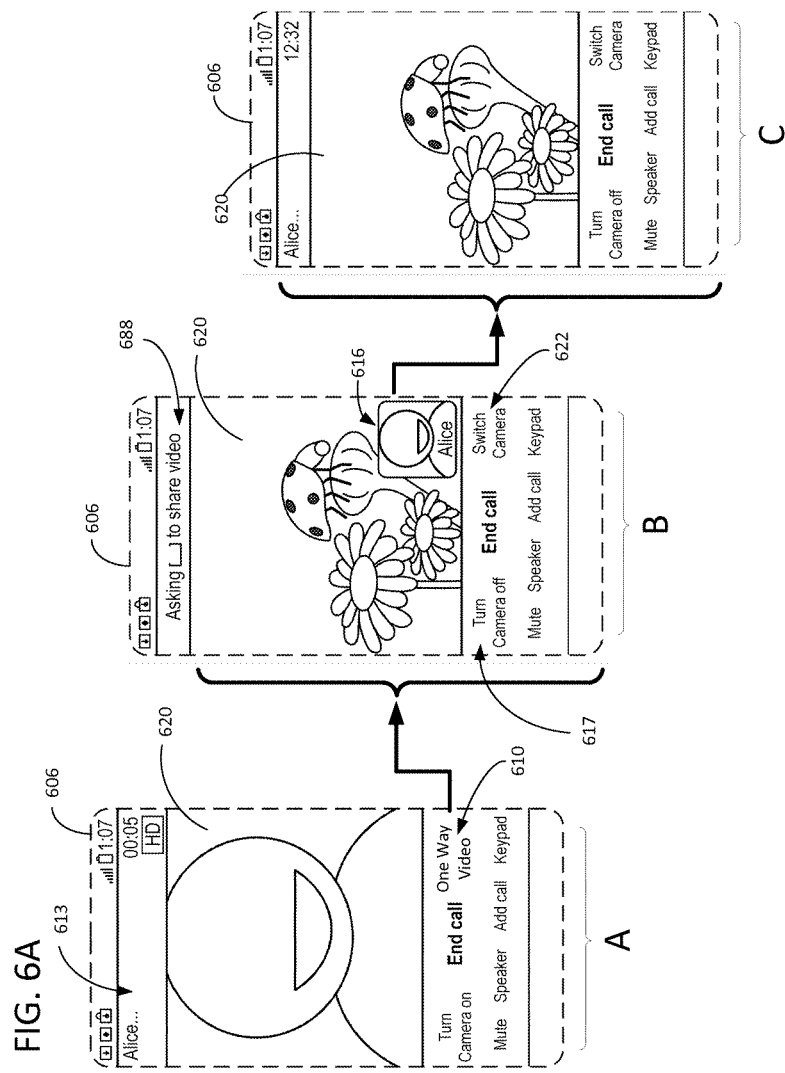

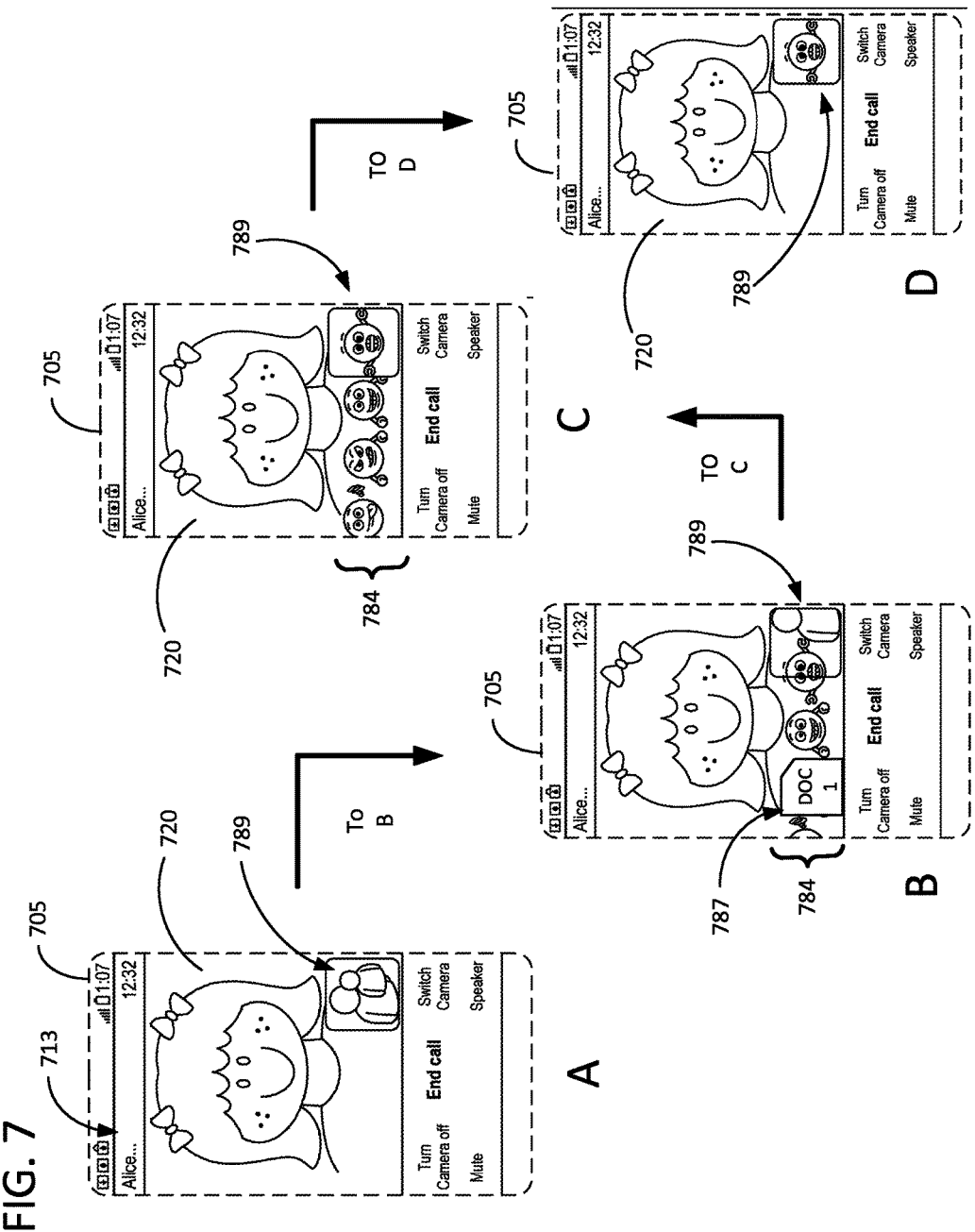

VOICE AND VIDEO CALLING OVER LONG TERM EVOLUTION-BASED USER INTERFACE

BACKGROUND

In recent years, the capability for users to participate in video calling has become more prevalent, even in the context of mobile communication using portable devices. Mobile devices have become available that offer the capability for one user to establish a calling session with another user in which video is exchanged between the users. Mobile communication networks that typically handle voice calls are becoming capable of handling not only voice calls but also video calls. Currently, mobile network operators (i.e., cellular carriers) rely on third party applications to extend a voice call to a video call. In addition, some video calling systems require that the devices be compatible with one another. In other words, the mobile communication devices attempting to participate in the video call over the cellular network must be produced by the same manufacturer.

In order for these devices to perform the video calling over the cellular network, the mobile network operator may bifurcate the call into a data stream containing the video content and a voice stream that carries the voice signals. Since users are conscious of the cost of data transmissions via the cellular network, the cost of video calling may be prohibitive for some users. However, cellular carriers are increasingly moving toward a network implementation, such as 4 G Long Term Evolution, that transmits all information (voice or data) as packetized data over a network. As a result, third party applications may no longer be needed to provide video calling services to a cellular carrier subscriber device.

Hence, a need exists for a video calling feature that uses a mobile network operator's cellular communication network and that allows different types of mobile devices to communicate with one another through a common user interface, one that does not need downloading of a particular application from an application store for all users on a video call. In addition, use of the video calling feature should involve a minimal number of user inputs for a user to establish, participate in, and disconnect from a video call.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 provides examples of different views of a graphical user interface provided according to the process shown in FIG. 4.

FIG. 6A provides examples of different views of a graphical user interface for providing video of a first device with a second device.

FIG. 7 provides examples of different views of a graphical user interface for replacing video with alternate image data.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a video calling service provided by a mobile network operator (MNO) in close association with or as an extension of the MNO's voice call service. An MNO, in some examples, is an entity such as a cellular communication carrier or cellular service provider. The MNO may also be an Internet service provider or a digital media service provider, such as cable or satellite television provider. The video service provided by the MNO takes advantage of the data packet exchange capabilities of the MNO's mobile communication network (e.g., a long term evolution (LTE) network) much like advanced voice calling services over such an MNO network. The examples of the user interface (UI) for the associated voice and video functions provide an improved user experience. In particular, the various examples provide a process responsive to user inputs to the graphical user interface that utilizes functionality built into a user's mobile device without the need for downloading third-party applications or requiring complex set up actions by the user. In addition, the graphical user interface provides a display for the video calling functionality discussed herein.

The various system, mobile device and method examples discussed herein relate to a service that provides video call transitions from a voice call using IP Multimedia Subsystem or IP Multimedia Core Network Subsystem (IMS) enabled phones. IMS is an architectural framework for delivering Internet Protocol (IP) multimedia services. IMS uses the Session Initiation Protocol (SIP) to provide integration with the Internet, and provides access of multimedia and voice applications from wireless and wireline terminals. A user can connect to IMS in different ways, including the standard Internet Protocol (IP). IMS terminals (e.g., mobile phones, computers, and personal digital assistants (PDAs)) can register directly on IMS, even when they are roaming in a different network, as long as IP and SIP are accessible. Mobile access via an LTE network, wireless access (e.g., Wi-Fi, WLAN, WiMAX), and fixed access (e.g., cable modems, Ethernet, DSL) are all supported. In particular, voice and video calling over LTE networks implementing adaptive multi rate encoding standards provide an enhanced high definition user experience that allows a user to switch between a voice call and a video call through the examples described herein.

Figure 1:
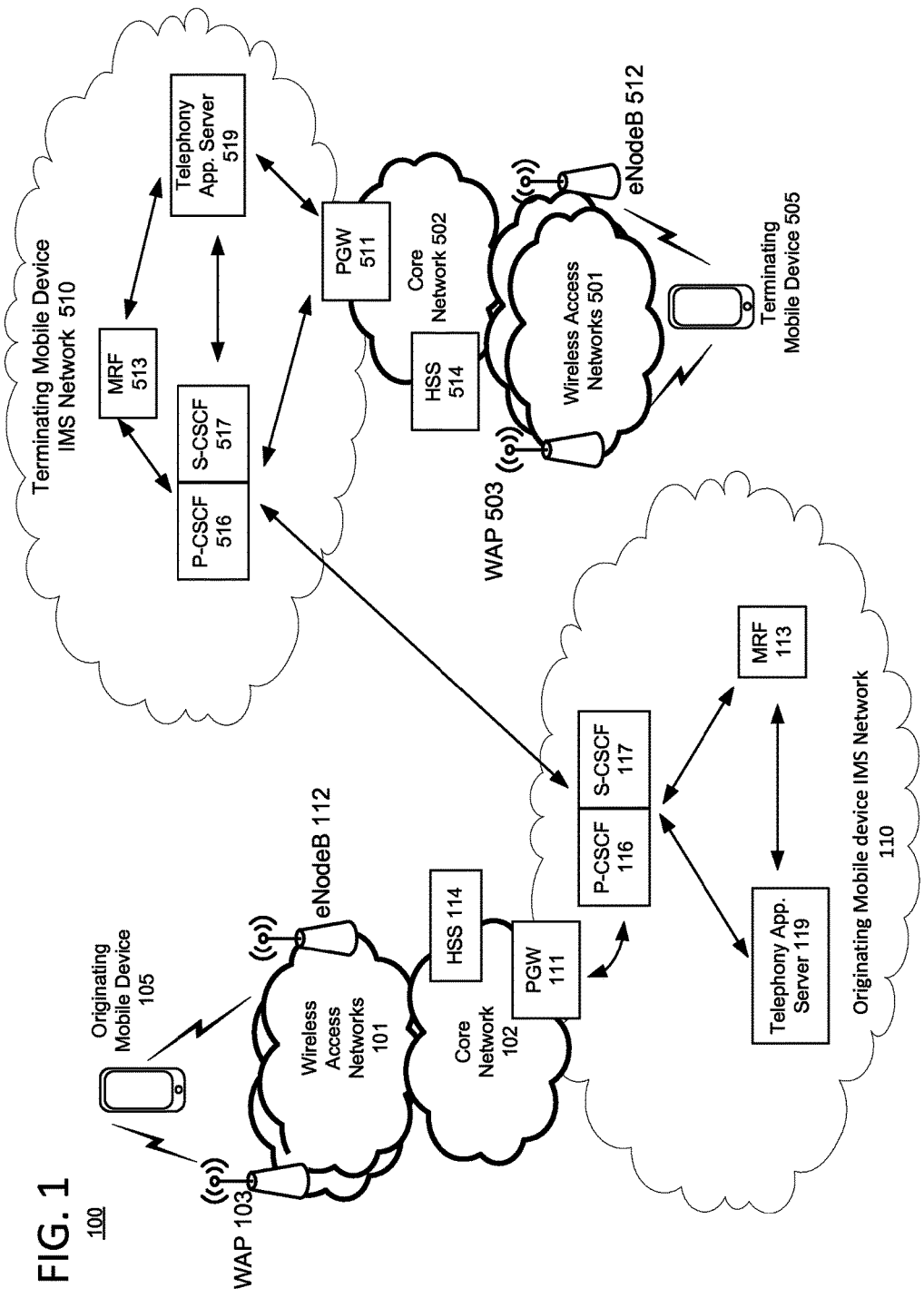
FIG. 1 is a high-level functional block diagram of an example of a system of networks/devices that provide various communications for mobile devices and support an example of the video calling service.

A communication signaling protocol, for example, hypertext transport protocol (HTTP), simple mail transport protocol (STMP), real-time transport protocol (RTP) and session initiation protocol (SIP) is used in the establishment and control of sessions between multiple users that enable the multiple users to communicate with each other and with various network devices. The described examples may be used with any number of signaling communication protocols with messages that establish, terminate and other functions related to calls between devices. SIP is a signaling protocol utilized in IMS networks. Shown in FIG. 1 are various pathways for signaling messages that are sent back and forth between the end users and various hardware devices within the IMS networks, in this example, to set up a mobile device-to-mobile device call. A general description of these components and the signaling between these components will now follow, after which examples of call flows will be described in somewhat more detail.

Reference now is made in detail to the examples illustrated in the accompanying drawings and discussed below.

FIG. 1 shows system 100 and signaling flow for a mobile call between mobile devices (MDs) 105 and 505. In general, MDs 105 and 505 communicate with their respective wireless access networks 101 and 501 that have connections with respective core networks 102 and 502 that connect to other networks to provide signaling to establish voice and data connections with destination or recipient devices/systems. The MDs 105 and 505, as will be described in more detail with respect to FIG. 11, include cameras that are configured to provide (i.e., generated via a sensor) a video stream of a live scene in real-time that is delivered from a first device (e.g., MD 105) to a second device (e.g. MD 505). A live scene is the environment around a user as the user is participating in a voice call with another user. In the example, both of the users of the first device and the second device have respective live scenes that may include themselves as well as events or things surrounding the respective users. FIGS. 6A, Views B and C, and 6B, View C, illustrate a live scene. Real-time refers to video generated via the cameras on the respective mobile device cameras while the user is participating in a voice and/or video call.

The wireless access networks 101 and 501, for example, may include cellular and/or Wi-Fi networks, and the core networks 102 and 502 may be packet data networks (PDN) or an evolved packet core (EPC). The wireless access networks 101 and 501 may be accessed via base stations, such as an eNodeB 112 or 512 (or the like). One or more of wireless access networks 101 (or 501) might be implemented as a network conforming to the long term evolution (LTE) standard, or a Wi-Fi network according to 802.11xx or the like. Access to the Wi-Fi network of wireless access networks 101 may be via a wireless access point (WAP) 103 (or 503). The core networks 102 and 502 may provide services such as a home subscriber server (HSS) 114 and 514, respectively, and a packet data gateway (PGW) 111 and 511, respectively. The HSS 114 and 514 may provide subscriber information related to the access to the respective networks 101, 102, 110, 501, 502 and 510. The other network elements may further facilitate session setup and provision of multimedia services to the calling mobile device 105.

The communications in a communication signaling protocol from each of the respective wireless access networks 101, 501 and core network 102, 502 are passed to the respective IMS networks 110 and 510 through packet data network gateway (PGW) devices 111 and 511, respectively. The respective PGWs 111 and 511 act as interfaces between, for example, the respective core networks 102 and 502 and IMS networks 110 and 510. Also included in IMS core 110 are one or more servers, called call session control function (CSCF) servers that control the signaling between the calling mobile device 105 via the respective IMS networks 110 and 510 to set-up a call with the destination mobile device 505. The initial contact by a calling mobile device 105 with the network 110 is through a proxy call session control function (P-CSCF) device 116 that acts as a SIP proxy server for network 110 and receives control signals from devices external to the network 110, such as the calling mobile device 105. A serving call session control function (S-CSCF) device 117 acts as a point of control in the network 110 and provides a number of functions to control the sessions between the mobile devices. For example, the S-CSCF 117 authenticates mobile devices with the network 110 communicates with the charging functions to insure an mobile device has proper permissions to access network services; serves to translate telephone numbers of mobile devices to uniform resource identifiers (URI) for use in the network 110, keeps track of charges incurred by users when access data services; and other services. Network 510 similarly includes an S-CSCF 516, a P-CSCF 517, a media resource function (MRF) 513 and a telephony application server (TAS) 519.

The P-CSCF servers 116, 516 may serve as a first point of contact between a calling mobile device 101, 505 and IMS core 110, 510. The P-CSCF servers 116, 516 may serve as an outbound/inbound SIP proxy server, where requests initiated by the calling mobile device 105, 505 may traverse to P-CSCF server 116, 516, respectively. For example, when attempting to establish a call session using a communication signaling protocol, such as SIP, the P-CSCF 116 is typically the first point of contact in the IMS network, such as IMS core 110 that receives, for example, a voice over packet protocol message (e.g., a SIP INVITE message). The P-CSCF 116 then utilizes the S-CSCF in its own network (in this example, S-CSCF 117) to locate the S-CSCF in the destination devices network (i.e. S-CSCF 517).

The S-CSCF server 117, 517 may include a communication signaling protocol (e.g., SIP) server that serves as a central node in the communication signaling protocol signaling plane. The S-CSCF server 117, 517 may perform session control. Another network element incorporated into the P-CSCF 116, 516 may be an interrogating call session control function (I-CSCF) server (not shown), which may include a communication signaling protocol server that may be located at an edge of an administrative domain. The I-CSCF server may publish its IP address in the Domain Name System (DNS) record of the domain in which the I-CSCF resides so that remote servers can find the I-CSCF and use the I-CSCF as a forwarding point for communication signaling protocol packets in the domain. In addition to communication signaling protocol proxy functionality, the I-CSCF may include an interface to the HSS (114, 514) to retrieve user information and to route messages to an appropriate destination (e.g., S-CSCF 117, 517).

A communication signaling protocol TAS 119, 519 provides applications for use by a mobile device. The TASs 119 and 519 provides services through applications related to signaling and media distribution. For example, signaling refers to resolving routing related to free calls, resolving telephone number translations that allow for telephone number portability and the like, while media distribution refers to establishing voice and video calling, conference calling and similar services. The MRF 113, 513 is configured to control the establishment/charging of resources within IMS core 110, 510. The communication signaling protocol TAS 119, 519 may include a communication signaling protocol entity that hosts and executes services, and interfaces with the S-CSCF 117, 517. The HSS 114, 514 may include a master user database that supports IMS network 110, 510 respectively and contains subscription-related information. The HSS 114, 514 may perform authentication and authorization of users and can provide information about a subscriber's location and IP information. As a call request message generated by a calling party is transmitted from one network element to another network element for subsequent delivery to a destination party, the call request message may be updated by the respective network element to include a custom header. The custom header may include information that identifies the respective network element, provides instructions for a subsequent network element, causes the respective network element to take an action based on the information, or the like. For ease of explanation and discussion, the call request will be referred to in terms of SIP messages. For example, a call request message in the SIP protocol, a SIP INVITE message, may have a custom header directed to another device or service in the network that receives SIP messages.

A video calling service may operate based on information obtained from a Telephony Application Server (TAS) 27 in coordination with a Media Resource Function (MRF) 34. In general, a TAS 27 is an entity that provides digit analysis and/or dialed number translations as well as other services to clients, generally network providers as well as end users, without actually performing the role of the network carrier or provider. A carrier/network operator may also represent one or more entities that utilize a TAS 27, for example, in order to provide improved content to their subscribers over their network. The TAS 27 typically operates a server which communicates through an IP network such as the Internet, and through a gateway and the network 15 with subscribers' mobile devices. The example of a system 10 utilizes a TAS 27 in coordination with a MRF 34 to provide information to mobile devices such as 105 and 505 related to the video calling service, and the TAS equipment is generally represented by the one server 27 in the drawing. The MRF 34 provides media related functions such as media manipulation (e.g. voice stream mixing) and playing of tones and announcements to mobile devices connected to the mobile communication network 15. For example, the MRF 34 provides information related to the video call participants. In this regard, the host device (terminal) and its associated user control the features of the call, including when the call begins and when it ends. When a first user initiates a video call by inviting another participant to the video call, the MRF 34 provides information, such as, for example, information related to the capabilities of the second (i.e., intended recipient or called) device.

The call request also includes information based on the session description parameters (SDP) that indicate the media capabilities, such as audio format, audio codec and the like, of the calling party. The parameters in the SDP are maintained throughout the processing of the call request (e.g., SIP INVITE) message as it traverses through the network. Maintaining the SDP ensures the calling party device is provided service according to the capabilities indicated by the SDP. For example, an audio media path is established between the calling device and an ultimate destination, whether that is the destination mobile device that the calling mobile device intended to call or if it is a voice mail service associated with the destination device. The audio media path has to conform to the capabilities of the calling device. Accordingly, the SDP remains the same as the call request (e.g., SIP INVITE message) is passed from one network element to another until the call request arrives at the ultimate destination device. In the present examples, the ultimate destination device may be either the destination device.

In the following described examples, MD 105 will be referred to as the calling MD (i.e., first MD), which means that the first MD 105 will be attempting to make a call to another MD, which in the following examples is the second MD 505. Second MD 505 will be referred to as the destination, or second MD 505. Of course, in other examples, the labels of calling MD (first MD) and destination MD (second MD) could be reversed. In other words, the designation of an MD as a calling (first) MD or a destination (second) MD is arbitrary, and is used in the present disclosure for ease of explanation.

Although communication signaling protocol, such as SIP, calls may be made from an MD operating in a packet (e.g., SIP capable) network to a device in a non-packet/non-SIP network, or to an MD operating in a packet (e.g., SIP capable) network from a device in a non-packet/non-SIP network, for discussion purposes, examples will be described in which the origination and destination MDs both support SIP and are both operating via SIP capable wireless network(s). Although, the two MDs may be operating in the same network in the example of FIG. 1, they are shown operating in two different networks.

Networks 110 and 510 may include any type of network or combination of networks such as LAN, WLAN, WAN, WWAN, etc. Each of networks 110 and 510 may be capable of providing a variety of communication network services, such as registration services, authentication services, authorization services, call session control services and other types of communication services. Specifically, these networks may be configured to include IMS networks. The networks 110 and 510 may communicate with one another through various network components.

With reference to FIG. 1, first MD 105 when attempting to call second MD 505 may first communicate with the cellular network 101 to which the first MD 105 subscribes. One or more initial signals, for example, a SIP INVITE message, may be sent from the first MD 105 to the cellular network 101, which forwards the signals to the core network 102. The cellular network 101 and core network 102 may, for purposes of discussion, be collectively implemented using a 4 G long term evolution (LTE) network. The signals are forwarded by the core network 102 to PGW 111. In general, PGW 111 provides an interface between the first MD 105 via the LTE network (i.e., cellular network 101 and core network 102) and the IMS network 101. Similarly, PGW 511 provides an interface between the LTE network (i.e., cellular network 501 and PDN 502) of second MD 505 and IMS network 510.

It should be noted that the various devices shown in FIG. 1, such as PGW 111, PGW 511, P-CSCF 116, S-CSCF 117, TAS 119, TAS 519, S-CSCF 516, P-CSCF 517, MRF 113, MRF 513 may include one or more of a variety of routing, computing and storage devices such as a router, a computer, a memory, a server, a cluster of servers or one or more of other types of computing or communication devices. In general, the respective PGWs 111 and 511 use the P-CSCF 116 and 516, respectively, as an access point to either IMS network 110 or 510. Each P-CSCF 116 or 516 acts as a proxy server for the first MD 105 or terminating MD 505, respectively. The S-CSCF 117 and 517 provide points of control in the respective IMS networks 110, 510 that enable control of all service delivery and control of all sessions.

The TAS 119 and 519 provide telephony services that are not directly related to routing user traffic packets through the network messages. For example, the TASs 119, 519 may provide services such as voice over LTE, call waiting, call forwarding, call conferencing, video calling, and other types of services. In addition, the TASs 119 and 519 are configured to perform functions, such as media management, call routing number portability and the like, related to the efficient management of network resources that are described in more detail below with respect to specific examples. For example, the respective TASs 119 and 519 control signaling related to establishing connections between MDs.

In an implementation, the first MD 105 user intends to contact a user of second MD 505 by inputting a telephone number assigned to the second MD 505 into an input device of the first MD 105. In response, the first MD 105 device generates a call request, such as SIP INVITE, message. The SIP INVITE message includes the address of the destination device second MD 505 that is transmitted by the first MD 105 via the wireless access network 101, the core network 102 and the PGW 111 to the P-CSCF 116 within the IMS network 110. The P-CSCF 116 exchanges signaling with the S-CSCF 117 to determine an address of the second MD 505. Upon receipt of the address of the second MD 505, which is in IMS network 510, the S-CSCF 117 forwards SIP INVITE message to the TAS 119. S-CSCF 117 forwards SIP INVITE message to the TAS 119 TAS 119 sends the SIP INVITE message back to S-CSCF 117 and from there the SIP INVITE goes to the S-CSCF 517. S-CSCF 517 then sends this SIP INVITE to TAS 519 to reach the second MD 505. In an implementation, a SIP INVITE message may be forwarded from the P-CSCF 516 and S-CSCF 517 through the PGW 511 to the core network 502, which may further process the message, for example, consult the HSS 514 to locate the second MD 505. After any core network 502 processing, during a typical operation, the call request message may be forwarded through the wireless access network 501 and be delivered to the second MD 505 even if the second MD 505 is unavailable to receive a call, which consumes network resources for the mere purpose of exchanging communication signaling protocol messages as explained above. In other words, a normal network path for a call request is, for example, the communication path through the various network and inter-network components that the call request from first MD 105 traverses to be delivered to second MD 505. As a result, network resources are consumed for the mere exchange of call set-up signals, and not the video/audio data exchanged between the users during the actual call.

The actual video call may be set-up in a variety of ways. Today many user devices and networks support voice over data communication, typically as voice over internet protocol (VoIP) communications, via a data session through the network(s) serving the requested party. The TAS server 119 may send SIP messages (e.g., initiate, terminate, and terminate sessions) and exchange other SIP signaling messages with the mobile First (MO) device 105 and the mobile second (MT) device 505 to facilitate communication over IP packets between the two devices. Once the VoIP call is set-up, the TAS 119/519 is no longer involved; packets are sent back and forth between the mobile device 105 and the mobile device 505 without going through the TAS 119/519.

Figure 2:
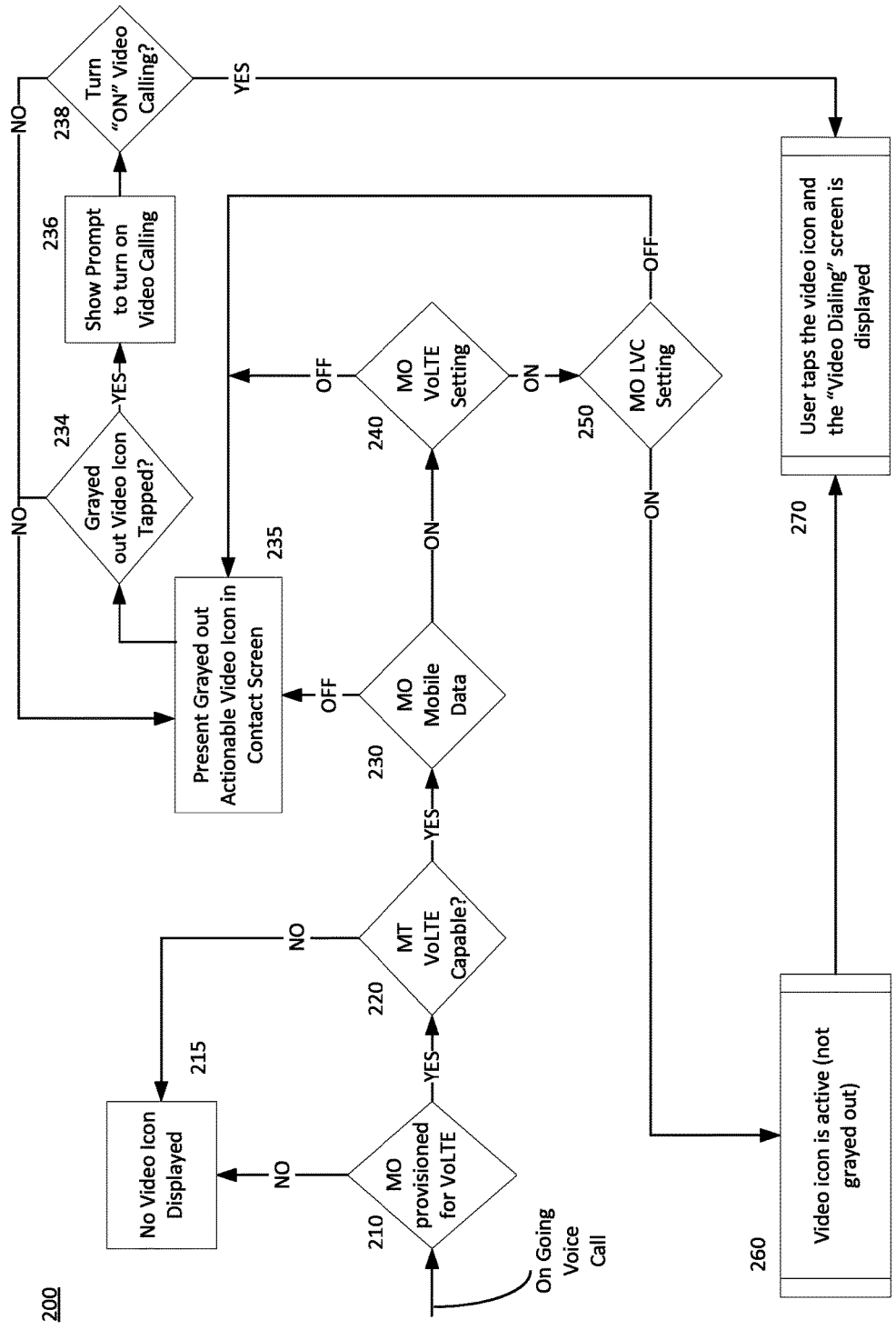
FIG. 2 is a high-level flowchart of an example of a process for upgrading a voice call to a video call and providing a video calling service graphical user interface.
Figure 3A:
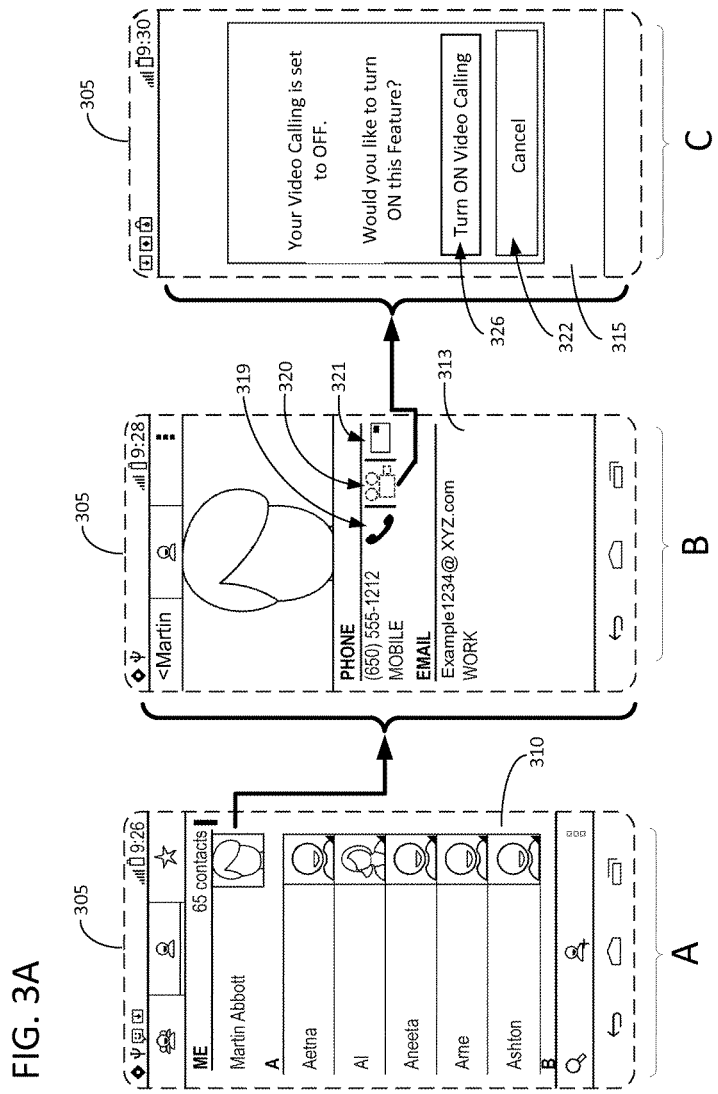
FIG. 3A provides examples of different views of a graphical user interface provided according to the process shown in FIG. 2.

Voice-over-LTE (VoLTE) is a service provided by a LTE network and is based on the IP Multimedia Subsystem (IMS) network. VoLTE provides specific profiles for control and media planes of a video/voice service on the LTE network. VoLTE delivers the video/voice service (e.g., the control and media planes) as data flows within a LTE data bearer. The above process may be used to establish a voice over LTE (VoLTE) call, which is essentially a VoIP call. In which case, the voice call is established over an LTE network. A process similar to the above may also be used to establish a video call between mobile devices FIG. 2 is a flow diagram of an example of a process for establishing and upgrading a voice call to a video call and providing a voice. The video call establishment and upgrade process 200 will also be explained with reference to FIG. 3. With reference to FIG. 3, a user may be determine which person to call based on information stored in a contact list of the user's mobile device. The mobile device 305 may have a display device 310 (as well as other components that are described in another example) that presents different graphical user interfaces such as a contact list. In the contact list presented in the display 310, a contact with the name "Martin Abbott" is presented at the top of the contact list and other contacts are presented below "Martin Abbott" (See A of FIG. 3). It may so happen, as in this example, that "Martin Abbott" may be the person that a user of mobile device 305 wishes to contact. Furthermore, the user of mobile device 305 may wish to contact "Martin Abbott" via a video call. Upon selection of "Martin Abbott" from the contact list, the mobile device processor (shown in another example) causes the display to transition to a contact listing screen 313 (See B of FIG. 3) for "Martin Abbott" that presents information that the user of the mobile device 305 has relative to "Martin Abbott." For example, the "Martin Abbott" contact listing screen presents information such as, an image of "Martin Abbott," a phone number (i.e. 650-555-1212), an indicator of the phone type (i.e., MOBILE), an e-mail address and an indicator of the e-mail type (i.e. WORK). In addition, the contact listing screen 313 presents icons for selection of different methods of contacting "Martin Abbott." The icons are shown as a telephone 319, a video camera 320 and a letter 321. Each of the icons 319-321 present options for further action, such as selecting the mode (e.g., voice call, video call or message (such as short messaging service (SMS) or e-mail)). Of course, Selection of the telephone icon 319 causes the mobile device 305 to attempt to establish a voice call using the telephone number with the contact "Martin Abbott" via a telephone service (or application) operating on the mobile device. Selection of the letter icon 321 causes the mobile device 305 to generate an e-mail directed to "Martin Abbott" via an e-mail application operating on the mobile device using the e-mail address listed for the contact "Martin Abbott." In the present example, the video camera icon 320 is of particular interest.

Prior to presentation of the contact listing screen 313 on the display device of mobile device 305, the mobile device 305 processor via the video call establishment process 200 may perform a determination regarding the capabilities of the mobile device 305 and the mobile device associated with a user of a selected contact, such as, in this example, the "Martin Abbott" contact. For example, after selection of a contact, or prior to the selection of a contact, a first mobile (MO) device (e.g., mobile device 305) may determine at 210 whether the MO device is provisioned for conducting VoLTE calls. The processor may make a determination whether the MO device is provisioned to conduct VoLTE calls by accessing a memory location within the MO device memory that stores information related to the telephone capabilities of the MO device. If the determination is "YES" the MO device is provisioned for VoLTE, the process 200 proceeds to 220. At 220, a determination is made whether the second (MT) device is also VoLTE capable (i.e., whether the MT device is able to participate in video calls calls). The MO device may make this determination based on a review of a memory location (e.g., a cache) that includes a historical list of devices with which the MO device communicated via VoLTE video calling or by receiving an indication during some communication (e.g., sharing of a contact or the like) that the MT device was VoLTE video calling capable (i.e., is able to conduct a video call over VoLTE). Alternatively, if the MO device does not have a record stored in memory regarding the MT device, the MO device queries a mobile communication network component, such as a presence server, to determine whether the MT mobile device has video calling capabilities. Alternatively, the MO device may forego the check of the MO device memory and proceed directly to querying the presence server or other device, such as HSS 114 of FIG. 1. If either of the determinations at 210 or at 220 is "NO," the video icon 320 is not displayed in the contact screen since at least one of the MO device and MT device is not able to conduct a video call over VoLTE. However, if the determination at 220 is "YES," the MT device is able to conduct a video call over VoLTE, the process 200 proceeds to determine, or confirm, additional information about the MO device. At 230, another determination is made regarding whether the MO device is configured to communicate using mobile data. If the determination at 230 is ON, the MO device is configured to exchange mobile data, the process 200 proceeds to 240. At 240, a determination is made whether the MO device has its configuration settings for VoLTE set for communication using VoLTE services. If the determination result is "ON," the process 200 proceeds to 250 where a determination is made whether the MO device settings for LTE video calling (LVC) are set to "ON." If the result of the determination at 250 is "ON," the process then proceeds to 260. However, if any one of the determination results at 230, 240 or 250 is "OFF," which indicates that the MO device configuration settings are not set to enable video calling, the process 200 proceeds to step 235.

At 235, the MO device processor (not shown in this example) configures the contact screen at FIG. 3, view B, to present the video icon 320 as grayed out (indicated by the dashed lines forming the video icon). While the video icon 320 is displayed as grayed out that does not mean that the video calling function is completely unavailable. In other words, the grayed out video icon 320 is actionable, which means that in response to the grayed out video icon 320 be selected (i.e., tapped) by a user (e.g. as in step 234), other screens (e.g., prompts) are presented to the user to enable the user make the needed changes to the MO device configuration settings. For example, at step 234, a determination is made whether the grayed out video icon is selected. If the determination is "NO," the video icon 320 remains grayed out. But, if the determination is "YES," the process 200 proceeds to 236 where a prompt (e.g., screen(s)) is presented (as shown in FIG. 3, view C, element 315) that allow a user to turn on video calling. The video calling screen 315, also includes 2 control buttons 326 and 322, which allow the user to continue to turn video calling "ON" or provide the option for the user to cancel tuning "ON" the video calling function. If the response at 238 is "NO" (i.e., the user selected the "CANCEL" control button 222), the process 200 returns to 235 to present the grayed out, but actionable, video icon 320. Conversely, if the determination, at 238, is "YES" (i.e., the user selected the "Turn ON Video Calling" control button 226), which indicates the user wants to turn on video calling, the MO device processor will make the appropriate configuration settings (e.g., perform one or more of turning ON the MO mobile data, turning ON the MO VoLTE setting, or turning ON the MO LVC setting), and the process 200 proceeds to 270. Alternatively, while not shown, the mobile device upon being configured with the appropriate video calling configuration settings at 238 proceeds to step 260 and indicates to the user via the active video icon that video calling is available.

Figure 3B:
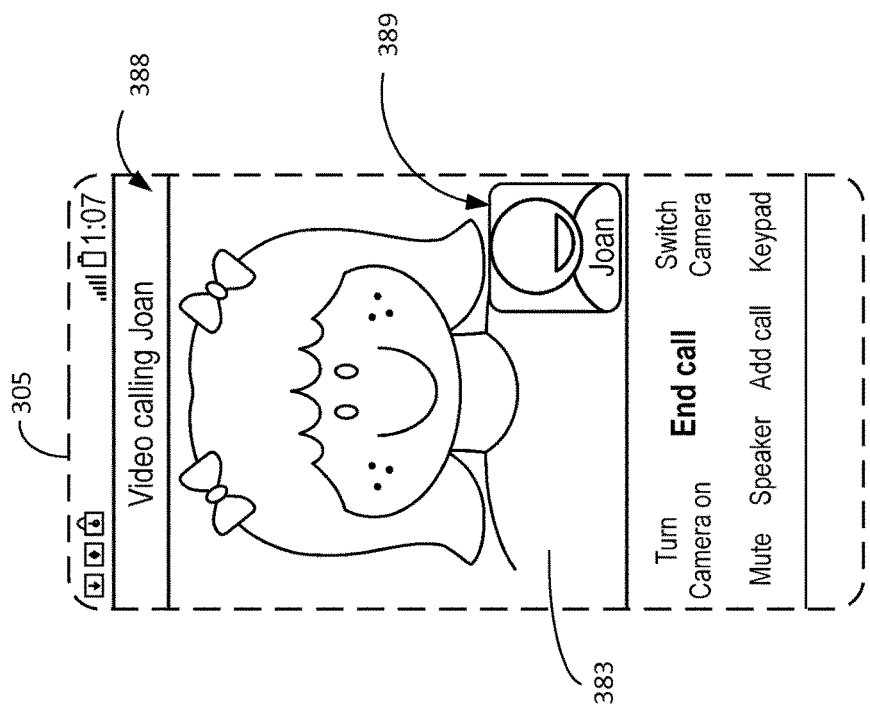
FIG. 3B provides another example of a view of a graphical user interface provided according to the process shown in FIG. 2.

At 260, the video icon 320 transitions from a grayed out, but actionable, icon to a bold icons, such as icons 319 and 321. In which case, the video calling option is now fully-enabled via selection of the video icon. At 270, in response to the user selection of the video icon, a screen (e.g., "video dialing" screen) indicating that the MO device is attempting to establish a video call with the MT device (e.g., the device of contact "Martin Abbott"). An example of the video dialing screen referred to in step 270 is shown in FIG. 3B. In FIG. 3B, the mobile device 305 presents in the display screen, a video calling screen 383 that includes a status banner 388. The status banner 388 may include a message informing the MO device user of the status of the video call. For example, the banner 388 indicates that the MO device is "Video calling Joan." In a portion of the display screen, which in this case is the video calling screen 383, a thumbnail 389 with a silhouette image labeled "Joan" is presented while the video call is being established. If an image of Joan was stored in the memory (e.g., in the user's contacts) of the MO device, the thumbnail 389 may present Joan's image retrieved from the MO device memory until the video call is established. Alternatively, if Joan (i.e., the MT device owner) wants her image to be private she may indicate in a setting that is provided to the MO device that only her name (i.e., "JOAN") be displayed to other users. This concept is similar, for example, to keeping a telephone number private with regard to caller identification functionality. Or, the message may be customizable based on Joan's current status, such as "In a meeting," "On vacation," "I'm Driving" or the like. In another example, Joan may provide an address of an image stored in database (provided by the wireless access network, or IMS network) external to the mobile devices, or via a website hosted on a server (not shown, but, for example, part of the wireless access network) accessible by the MO or MT device, such as a social media server, or may substitute another image, such as a beach scene when Joan is "On Vacation." For example, the user may combine the custom message with an image pulled from a database or website.

Figure 4:
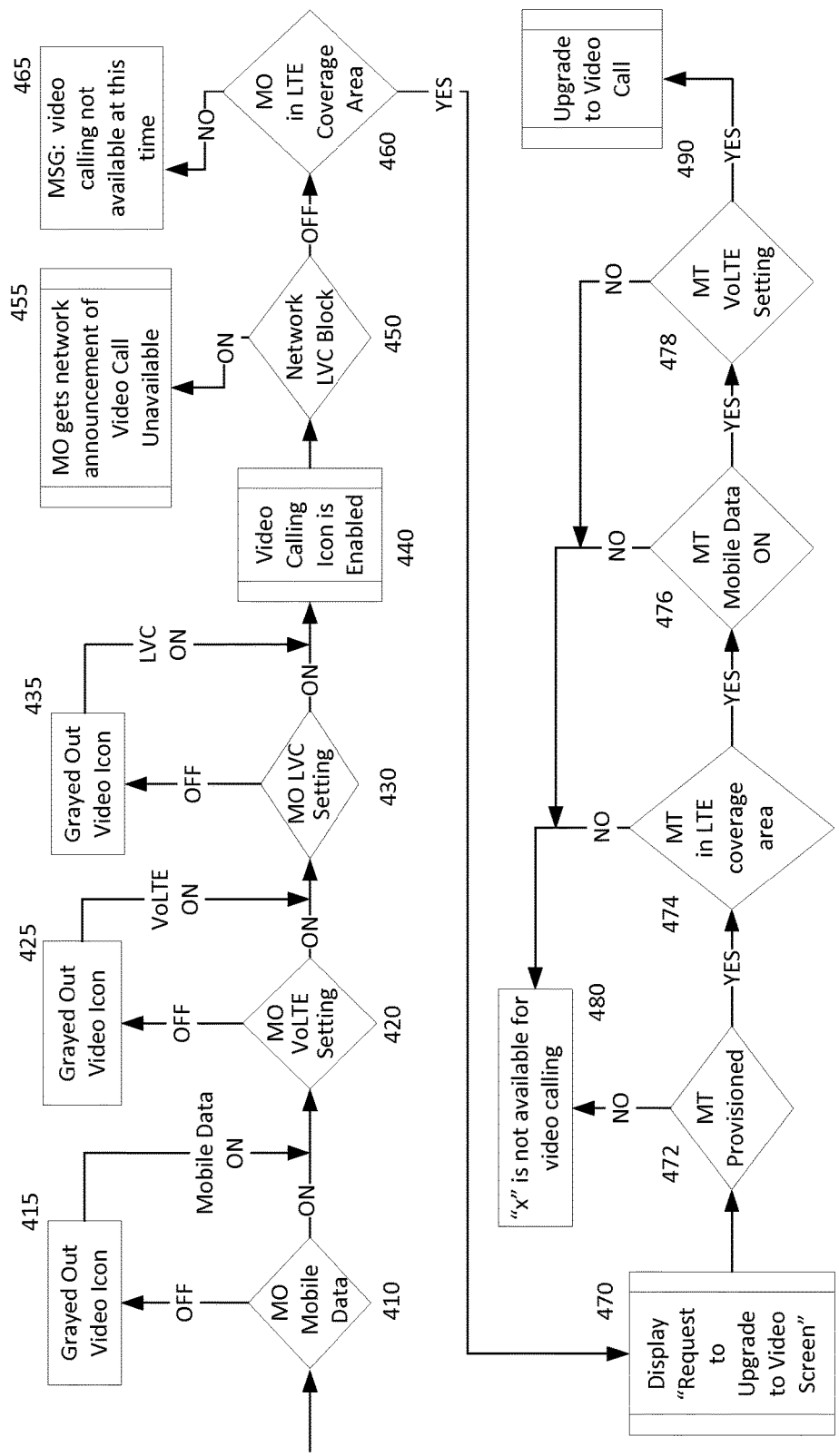
FIG. 4 illustrates a flow chart of an example of video call logic for transitioning a voice call to a video call.

In some instances, during a voice call between a pair of users, one of the callers may desire to start a video call with the second device user. In order to start a video call, while participating in a voice call, a user may follow a process similar to the process illustrated in FIG. 4. FIG. 4 illustrates an example of video call logic for upgrading a voice call to a video call. Of course, it is presumed that the mobile devices in the example are equipped for and have access to the network services needed to establish and participate in a video call.

During the voice call between a video call requesting (i.e., an First or MO) mobile device and a video call recipient (i.e. a second or MT) mobile device, the video call requesting mobile device confirms that the requesting mobile device settings used for video calling are set to be on. As shown in FIG. 4, the confirmation of the MO device settings begins at 410 and continues to step 430. At 410, the MO mobile data settings are confirmed to be ON, if not ON, the process 400 proceeds to 415 where the video calling icon such as 320 from FIG. 3, is shown as grayed out, but the video calling icon is still actionable as described with respect to FIG. 2. Whether a device, either the MO or the MT device, is capable mobile data exchange may be determined by querying the home subscriber system (HSS) of the network. The MO device user has the option of selecting the grayed out video calling icon. In this example, the MO device user may be presented with a prompt, such as described with respect to steps 235 and 236 of FIG. 2, to turn on the mobile data setting. Upon turning ON the mobile data setting the process 400 may proceed to 420.

However, if the MO device processor determines at 410 that the MO device data setting is set to ON, which means the MO device is configured to exchange data over the mobile network (e.g., 15 of FIG. 1), the process 400 proceeds to 420. At 420, the MO device processor confirms that the VoLTE settings of the MO device are also set to ON. If the VoLTE settings are not ON, the process 400 proceeds to 425, where the video calling icon is shown as grayed out. The VoLTE settings may be confirmed by querying the call session control function (CSCF). In response to the query from the MO device, the CSCF may perform an electronic numbering (ENUM) query to determine where to route the call. Typically, the serving call session control function (S-CSCF) performs the ENUM query. The ENUM query is used identify the target number (i.e., the mobile device number (MDN) of the MO device) as a VoLTE subscriber. The S-CSCF using special domain name system (DNS) record types to translate a telephone number into a Uniform Resource Identifier (URI) or IP address that can be used in Internet communications. Using this information the Similar to step 415, the MO device processor may maintain the video calling icon in the grayed out state because the MO device VoLTE settings are set to OFF. In this example, the MO device user may be presented with a prompt, such as described with respect to steps 235 and 236 of FIG. 2, to turn on the MO device VoLTE setting. Upon turning ON the MO device VoLTE setting, the process 400 may proceed to 430. At 430, the MO device confirms that the MO device LVC settings are ON, if not ON, the process 400 proceeds to 435, where again the MO device processor maintains the video calling icon in the grayed out state. Similar to steps 415 and 425, the MO device user may be presented with a prompt, such as described with respect to steps 235 and 236 of FIG. 2, to turn on the mobile data setting. Upon turning ON the MO device LVC setting, the process 400 may proceed to 440. At 440, the video calling icon is presented on the MO device display screen as enabled. Although described as three individual steps (i.e., 415, 425, 435), it is envisioned that steps similar to steps 234-238 of FIG. 2 may be executed when a user selects a grayed out video calling icon and that the minimum required device settings for the MO device to perform a video call are set.

With the video calling icon enabled at 440, the MO device processor may perform additional confirmations related to video calling. For example, after 440, the MO device may determine, at 450, whether the mobile communication network is permitting LVC calling. The mobile communication network may be limiting LVC calling due, for example to limited bandwidth availability or other factors. When performing step 450, the MO device may query a network device, such as an eNodeB (e.g., element 17 of FIG. 1), to receive an indication of the availability of LVC calling. The MO device may receive in a response from the network that NO, LVC calling is not available and LVC is blocked. At 455, the MO device processor may present a status message on the MO device display device that the video calling is not available. If LVC blocking is OFF, which means that LVC is available via the network, the process 400 proceeds to 460. At 460, the MO device determines whether the MO mobile device is located in a mobile communication network (i.e., LTE) coverage area in which video calling is available through the mobile communication network is available. This determination may be performed by the MO device by accessing a memory location that informs the MO device of different settings related to the MO device. Although shown at 460, the determination may be made prior to the launch of the on-going voice call or prior to launch of a video call. In addition, the MO device may receive a settings refresh message from the network every few days informing the device of the current device settings. For example, the MO device may request information by querying a network presence server associated with the MO device. If the result of the determination at 460 is NO, the MO device is not in a network coverage area that supports video calling, then the process 400 proceeds to 465. At 465, a message is presented on the MO device display that video calling is not available at this time. However, if the MO device is located in an LTE, or in a mobile communication network coverage area, the process 400 proceeds to 470.

At 470, the MO device presents a prompt that when selected allows the MO mobile device to upgrade a voice call to a video call by generating a request through the mobile communication network to the MT device (i.e., the other party to the call). For example, the displayed prompt or control button may say; "Request to Upgrade to Video Call" or the like. Also at 470, the MO device user, upon selection of the control button, or via another input, such as voice, a request for upgrade to a video call is generated.

In response the MO device user selection of the upgrade to video call control button, the MO device determines whether the MT device is provisioned for video calling. The MO device may store a history of video calling participants in a memory of the MO device. In response to the query, the MO device may access the MO device memory to determine if the MO device and the MT device participated in a video call in the past. If the MO device does not have a record stored in memory regarding the MT device, the MO device queries a mobile communication network component, such as a presence server, to determine whether the MT mobile device has video calling capabilities. Alternatively, the MO device may forego the check of the MO device memory and proceed directly with the query of the presence server.

However, if the MO device and the MT device have participated in a video call, the process 400 may proceed to step 474. Similarly, if the response from the network component is YES, the MT device is provisioned for video calling, the process 400 proceeds to 474. Conversely, if the network component responds with an indication that the MT device is not provisioned for video calling, an indication of the unavailability of the MT device may be presented on the display device of the MO device (480).

Additional confirmations of the MT device configuration settings may also be performed to insure that the MT device is configured to participate in a video call. These confirmations, shown in steps 474-478, are made by the MO device querying a network component such as a CSCF or MRF component of an IMS network. For example, at 474, the network component confirms with the MO device that the MT device is in an LTE coverage area. If the network confirms that the MT device is in an LTE coverage area, the process 400 proceeds to 476. At 476, the MT device mobile data settings are confirmed to be set to ON. If the MT device mobile data settings are ON, the process 400 proceeds to 478, and the MT device VoLTE settings are confirmed to be ON. If all of the settings in steps 474-478 are confirmed to be ON, the process 400 proceeds to 490 where the network permits the upgrade of the voice call between the MO device and the MT device to proceed, if the parties to the call agree.

Note that if any of the confirmations in 474-478 receive a response of NO, the respective settings (e.g., LTE coverage area, Mobile data, VoLTE setting) are not ON, the process 400, proceeds to 480 and the MO device is notified that the MT device cannot participate in a video call at this time, or a similar message is provided to the MO device.

When the upgrade to video call at 490 is indicated, the graphical user interface may present different controls for selection by the user. Said differently, in response to a determination that the intended second mobile device has video calling capabilities, a camera control input may be provided on a graphical user interface of the MO device. For example, FIG. 5 illustrates an example of the MO device display when a video call is requested during an ongoing voice call and an illustration of the process for completing the upgrade from a voice call to a video call.

As shown in View A of FIG. 5, the mobile device 505 during a voice call and when in a position to be viewed by a user presents a display screen 520 that shows an silhouette of a person, perhaps an actual image of a user (the callee or other party) or other image associated with the user (the callee or the other party). In addition, a caller indication 531 that identifies the contact name or the mobile device number (MDN) associated with the mobile device of the other party (i.e., the callee) to the call. In the example of FIG. 5, and for ease of explanation, the mobile device 505 may be considered the first, or MO, mobile device, and the called party or party with whom the MO device is conducting the voice call is considered the second (MT) mobile device. To request the video call, the MO device user may select camera control input 517, which reads "Turn Camera On." Of course, a voice input or other input may be used to request the video call.

The presentation of View A of FIG. 5 transitions to that of View B, in response to a selection of the camera control input 517, the MO mobile device processor turns on a user-facing camera but still maintains the presentation of the silhouette or other image the user (i.e., callee or other party) in a display portion (occupied by display screen 520) of the graphical user interface of the MO mobile device 505. The information presented on the MO mobile device includes the display screen 520, a status banner 588, and a camera control input 517. The status banner 588 presents an indication of the status of the video calling request. For example, a status indication may be "requesting video calling," "video calling Alice," or the like. In addition, the camera control input 517 may have two states, one that allows the user to turn the user-facing camera ON, and another that allows the user to turn the user-facing camera OFF.

Upon receiving an indication that the MT device has accepted the video calling request, the MO device processor transitions the display portion 520 to present the screen shown in View C of FIG. 5. The MO device processor presents video image collected by the MO device 505 user-facing camera to a thumbnail display area 589 within the display portion 520, and presents the image collected by a camera of the MT device. In this case, the MT device camera is the user-facing camera and a video image of Alice is presented on the display screen. In addition, the status banner 588 is removed and replaced with an indication of the contact name (e.g., Alice) or MDN number associated with the MT device. As such, the display portion 520 of the graphical user interface of the MO device 505 presents video from the second mobile device with which the video call is being conducted.

As for the receiving party at the MT device, when the banner 588 is presented on the MO mobile device as shown in View B of FIG. 5, the MT receiver is presented with a menu prompt that provides the MT device the capability to answer a video incoming call. For example, the menu of options provided may include selections for Answer video, Answer voice, or Ignore.

In summary, a video call is an extension of a voice call. Parties in a voice call may decide at any time during the voice call to switch to a video call. The originator of a call (i.e., MO device) can elect to turn on the camera, which causes a request to be sent to the callee (i.e. MT device). Either the MO device or the MT device may request a video call. Said differently, the requesting caller (RC) selects a camera "On" button, the camera facing the RC turns on and presents the RC's image on the display with a banner indicating that the request is delivered to the non-requesting caller (NRC). If the NRC accepts the request, the RC image is replaced with the NRC's image and the RC is presented in a thumbnail image. If NRC rejects request, the call remains a voice call and the RC is presented with a banner indicating video call request was rejected.

In another example, the MO device user may wish to present to another caller a presentation of what the MO device user is seeing. For example, the MO device user's child may be a fan of ladybugs and the MO device user may be on a nature hike. Instead of taking a video, storing the video and transmitting the stored video at another time, the MO device user may wish to have a child (the callee) witness the ladybug at the same time as the MO device user sees it. In other words, the caller and callee may see the event as the event is taking place (i.e., "a live video feed") instead after the event ends. This is advantageous because the buffering of the video may consume a large amount of memory and make it difficult to later transmit the large video to the child.

The configuration setting confirmations discussed above with respect to FIGS. 2 and 4 may also be performed. Once these confirmations are performed and the respective MO device and MT device are configured to participate in a video call, either device is able to request a video call. FIG. 6A illustrates the screen views as a user requests and provides a real-time video feed of a live scene, such as what the user of one device sees through their mobile device camera, to another mobile device. In FIG. 6A, a mobile device, such as mobile device 606, is considered the first (MO) mobile device. In the illustrated example of View A of FIG. 6A, the MO device 606 presents a display portion 620 that shows an silhouette of a person, perhaps an actual image of a user or other image associated with the user. In addition, an indication 613 of the contact or the mobile device number (MDN) associated with the mobile device of the other party to the call. In the example, the indication 613 indicates that the user of the MO device 606 is currently participating in a voice call with "Alice."

The one way video control 610 is presented on display portion 620 in View A because both the mobile device 606 and the MT device are confirmed as being configured to participate in a video call. In response to the selection of the one way video control 610, the display portion 620 transitions to View B of FIG. 6A.

As shown in View B, in response to the selection of the one way video control 610, the MO mobile device processor turns on the rearward facing camera (i.e. the camera not facing the user) (not shown) on the backside of most mobile devices is presented in the display portion 620. The generated video is presented in the display portion 620 of the graphical user interface of the MO mobile device 606. The information presented on the MO mobile device includes an updated display screen 620, a status banner 688, a temporary thumbnail display area 616, and a camera control input 617 as well as a switch camera control 622. The changes as a result of the transition to the display screen 620 include the substitution of the real-time video stream of a live scene generated by the rearward-facing camera for the default or contact image of the MT device party, and the addition of the temporary thumbnail display area 616 within the display portion of the graphical user interface of the MO (i.e., first) mobile device. The temporary thumbnail display area 616 temporarily presents an image associated with the contact associated with the MT device, in this case, Alice. In other instances, in which an associated image is unavailable, a default image may be incorporated based on a selection by the MO mobile device processor. For example, the thumbnail display area 616 may be a default image that is presented until the MT device user accepts the video call request, or it may be the image that the MO device has associated with the contact Alice. The status banner 688 presents an indication of the status of the video sharing request. In addition, the camera control input 617 may have two states, one that allows the user to turn the user-facing camera ON, and another that allows the user to turn the user-facing camera OFF.

Upon receiving an indication that the MT device has accepted the video calling request, the MO device processor transitions the display portion 620 to present the screen shown in View C of FIG. 6A. The MO device processor switches the presentation of the video image collected by the MO device 606 user-facing camera from being presented on the display portion 620 of the graphical user interface to the thumbnail display area 616 within the display portion 620, and presents the image collected by a camera of the MT device. In this case, the MT device camera is the user-facing camera and a video image of Alice is presented on the display screen. In addition, the status banner 688 is removed and replaced with an indication of the contact name (e.g., Alice) or MDN number associated with the MT device (not shown). As such, the display portion 620 of the graphical user interface of the MO device 606 presents video from the MO mobile device. Similar video as that shown in display portion 620 is also sent to the MT device for presentation on a display of the MT device.

Figure 6B:
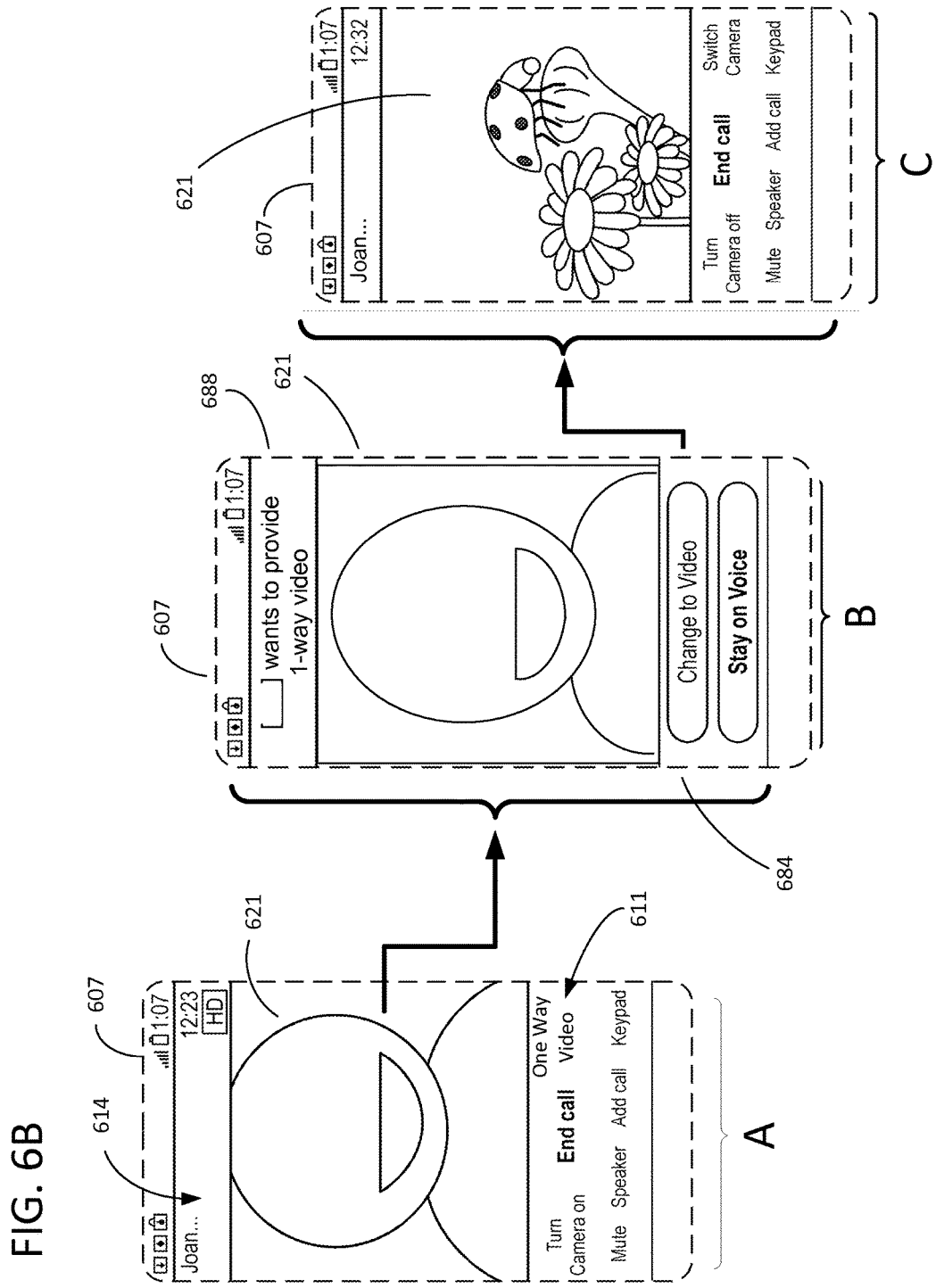
FIG. 6B provides examples of different views of a graphical user interface for receiving video of the first device by the second device.

FIG. 6B illustrates an example of the MT device in a one-way video scenario described with reference to FIG. 6A. In View A of FIG. 6B, the MT device, or other user device (e.g., user 2 shown as "Joan") 607, includes a display portion 621, a caller indication 614 (similar to caller indication 531 of FIG. 5), which identifies the other party or other party's device, and a one-way video button 611. This is similar to the user 1 device (i.e., the MO device) of View A as shown in FIG. 6A. The user 2 device 607 of FIG. 6B, in response to receiving a one-way video request from the user 1 device, is presented with a display portion 621. In addition, the one way video button 611 of View A is replaced with user controls 684 that provide user 1 with a choice of "Change to Video" or "Stay on Voice." In addition, a banner 688 is presented that informs user 2 with an indication that user 1 wants to provide a one-way video to the user 2 device 607. If user 2 accepts via selection of the "Change to Video" user control from user controls 684, the display portion 621 of user 2's device 607, as shone in View C of FIG. 6B begins presenting video obtained by the camera (backside camera) of the user 1 (i.e. MO device 606) is delivered to the user 2 device 607 without a thumbnail of user 1 being presented in a display portion 621 of the user 2 (i.e., MT) device 607.

In another example, a first user (e.g., user 1) of a device 705, such as an MO device, may be engaged in a video call with a second user (e.g., user 2), such as an MT device (not shown). The user 1 MO device may present an image as shown in FIG. 7, View A. In View A, the caller indication bar 713 (which identifies the other party or the other party's device) is presented, with the display portion 720 presenting the user 2 of the MT device, and a thumbnail 789 showing the real-time video of a live scene generated by the user facing camera of the MO device 705. User 1 may select the thumbnail 789, for example, by touching the thumbnail 789 on the display device of the MO device 705. The MO device 705 may be a touchscreen that accepts user inputs or may be a hard key on the MO device. Upon selection of the thumbnail 789, the display on the MO device may transition to present a view as shown in View B of FIG. 7.

In View B, a menu 784 of alternative images may be presented to user 1 for selection. For example, the presented menu 784 may be a scrollable menu of alternative images. The alternative images shown in the menu 784 may be drawn from a number of sources. The alternative images that are presented may be determined based by user preference settings. The user 1 may input as a user preference setting a file location or website address (i.e., uniform resource locator (URL)) that the MO device processor is to search for alternative images. The menu 784 may include videos (not shown), documents, such as 787, and icons, such as the emoticons. The menu 784 may be built based on preferences obtained from user 1 preference settings. For example, user 1 may indicate that a specific file folder from the mobile device memory, a cloud storage location, a URL from a video site, a website URL or other locations may be specified by the user. The menu 784 may be configured to show a frame of a video or the like or a default representation of the video with an identifier (e.g., file name, such as DOC 1 of document 787, a URL or the like). Alternatively, the MO device 705 processor may access a default location and present default images or videos or links in the menu 784. The menu 784 scrolls through the thumbnail 789, which is used to highlight a menu item, such as 787, for selection by the user 1. For example, as shown in View B of FIG. 7, user 1 may scroll through the menu 784. When, as shown in View C of FIG. 7, an image is in the thumbnail 789, a user may select, by touching the thumbnail 789 or via another input to the device 705, the image in the thumbnail 789. In response to the selection of an alternative image (in this example, an emoticon), the MO device 705 processor may transition the display portion 720 to the presentation of the selected alternative image in the thumbnail 789 as shown in View D. In other words, upon receiving the selecting input from the user 1, the MO device replaces the camera video image with the selected alternative image as shown in View D of FIG. 7. Changing the thumbnail image 789 also causes the camera video that is being sent to the MT device to be replaced with the selected alternative image.

The ability to send files instead of video during the video calls allows for the presentation of documents and the like during the video call via a simple process. A benefit of this feature is that discussion of a document, news article, video from a video service or the like during a video conference is easily accomplished.

Figure 8:
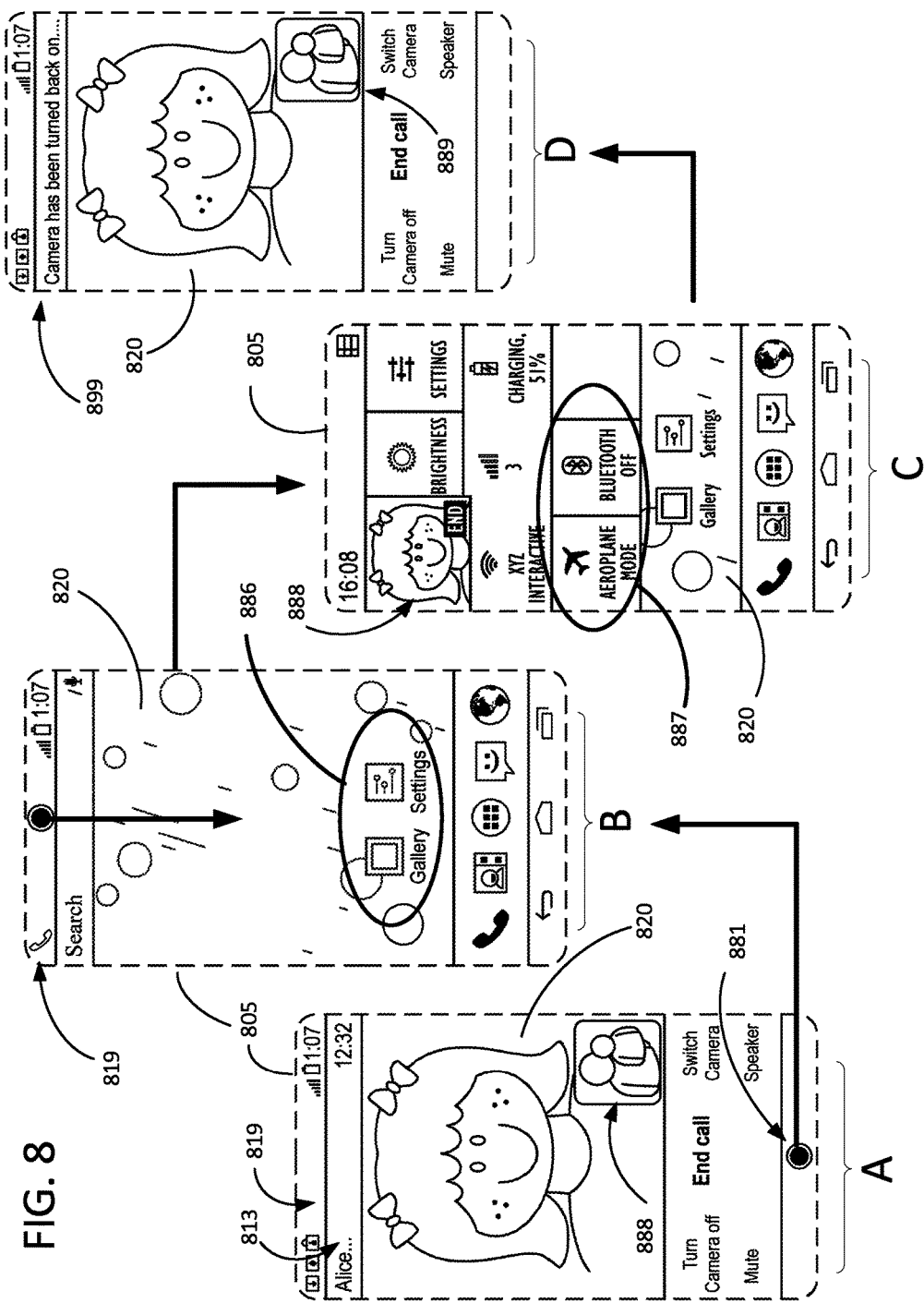
FIG. 8 shows examples of different views of a graphical user interface for performing additional tasks with a mobile device while a video call is in progress.

FIG. 8 illustrates an example that allows a user to perform multiple tasks while on a video call. In View A, the user (i.e., user 1) of device 805 is engaged in a video call with user 2, who is identified in the caller indicator bar 813. A video image of user 2 is shown in display portion 820 and a video image of user 1 is shown in thumbnail 888. The device 805 also includes a notification bar 819 within the display portion 820. The notification bar 819 is an area of the display portion in which an icon is presented to inform user 1 of different processes, alerts, information or other "notifications" are available for user 1 to view. For example, notifications are available for notifying user 1 of incoming e-mails, text messages, breaking news items, low battery indication, Wi-Fi availability and the like. A "Home" key 881 is also provided on the device 805. The Home key 881 may be either a hard key on the device 805 or be a soft key in the display portion 820.

During the video call, a user may select the home key 881. In response to the selection of the home key, the mobile device 805 processor may replace the incoming video of the video call that appears in display portion 820 of View A with a Home screen, but the audio portion of the video call continues uninterrupted. In an example, the user-facing camera of user 1, may pause the collection of video of user 1, and user 2 may be presented with either a default image or a message indicating user 1 has paused their collection of video. Returning to the discussion of the user 1 device, the user 1 device Home screen as shown in View B may include a number of icons 886 that represent applications that may execute on the mobile device 805. The applications may launch when a respective icon is selected via a user input. View B also shows the notification bar 819 and the home screen of user 1. User 1 may select one of the icons and perform a task. Should User 1 wish to see the video of user 2, user 1 may swipe the notification bar 819 (shown by downward facing arrow originating at the notification bar 819) and the display portion of device 805 may transition to View C. In View C of FIG. 8, the user 2 video 888 is presented in a portion of the display portion 820 with device 805 settings 887. In response to the user 1 selection of the user 2 video 888, the device 805 processor transitions to View D in which the user 2 video fills the display portion 820. In addition, the video from the user facing camera of device 805, which collects an image of user 1, may resume being presented in the thumbnail 889. In addition, the banner 899 may indicate to user 1 that the user 1 camera has been turned back on.

Figure 9:
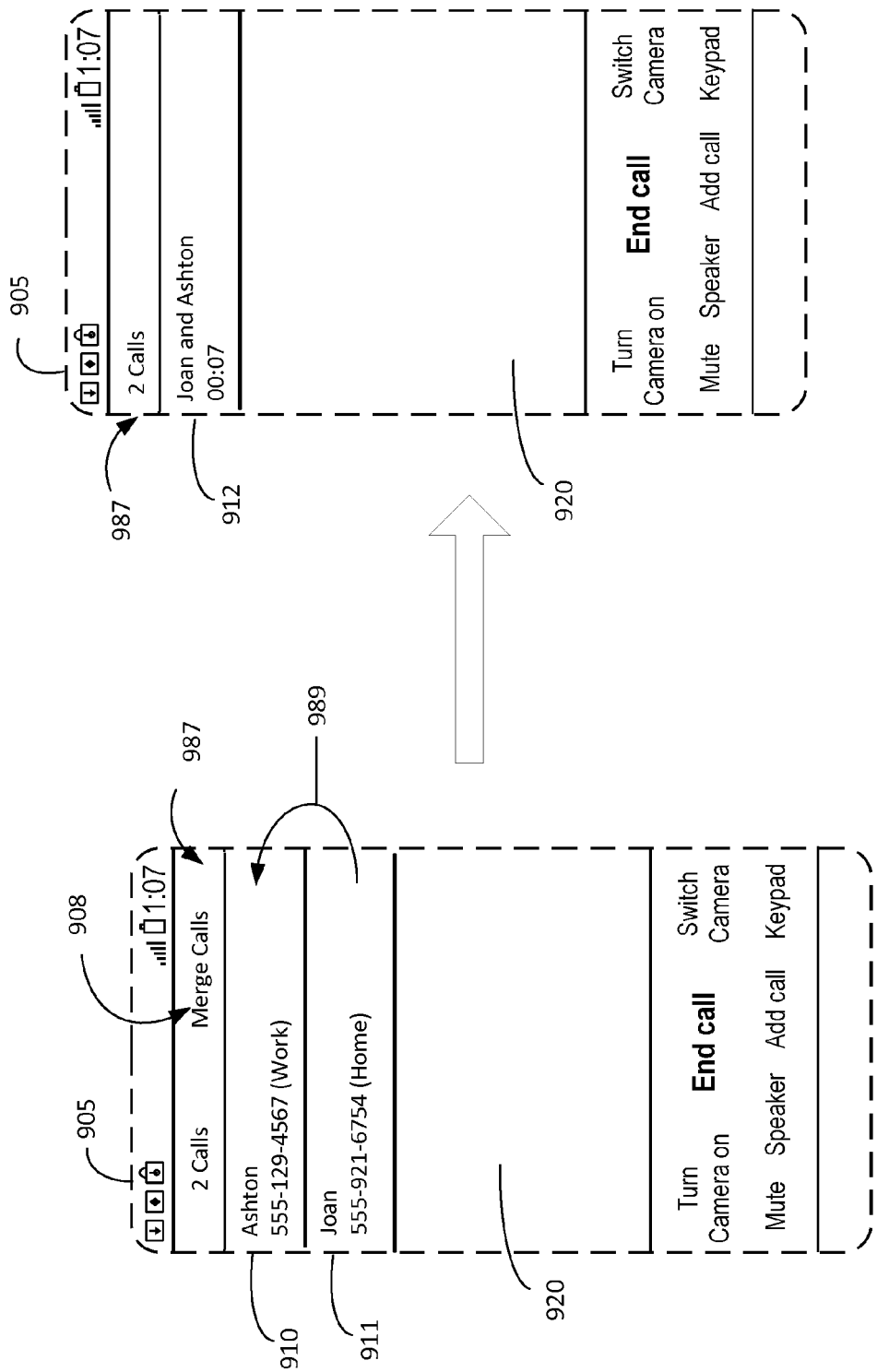
FIG. 9 shows examples of different views of a graphical user interface for merging calls during a voice call.

FIG. 9 illustrates an example of a graphical user interface and process for merging calls in VoLTE environment. Mobile device 905 is connected in two separate voice calls 910 and 911. A merged call may be considered to be similar to conference call in which one call (e.g., 910) to the called party (i.e., the mobile device 905 user) may be merged or combined with another call (e.g., 911). In the merged call, all three of the parties, Ashton, Joan and the user of mobile device 905 may conduct a call with all three parties talking to one another as in a conference call. The display portion 620 includes information regarding each of the calls 910 and 911 and a status bar 987. For example, the information regarding call 910 shows that it is from Ashton and originates from telephone number 555-129-4567, which the mobile device 905 has identified as Ashton's work number. Similarly, call 911 is from Joan, whose telephone number is 555-921-6754, which the mobile device 905 has identified as Joan's home number. While only two calls 910, 911 are shown, it is envisioned that more calls, such as 3-5, may be merged. The example illustrates two different methods for merging calls. In a first example, the status bar 987 has a control 908 (e.g., "Merge Calls") that may be selected by the user of mobile device 905 to merge the calls. In a second example, the user of mobile device 905 may touch the display portion 920 at one of the calls, such as call 911, and via a drag and drop operation 989, the mobile device 905 user may drag call 911 on top of call 910 and drop by removing their touch. In either the first or second example, the display portion of mobile device 905 transitions as shown by the arrow to mobile device 905 in which the display portion 920 now presents a merged call 912 with Joan and Ashton. The status bar 987 indicates that two calls are still being received by the mobile device 905. The merger of the calls occurs within the Media Resource Function (MRF) of the network 15 as shown in FIG. 1. This example provides the advantage of easily merging calls without having to navigate to other screens or applications.

Figure 10:
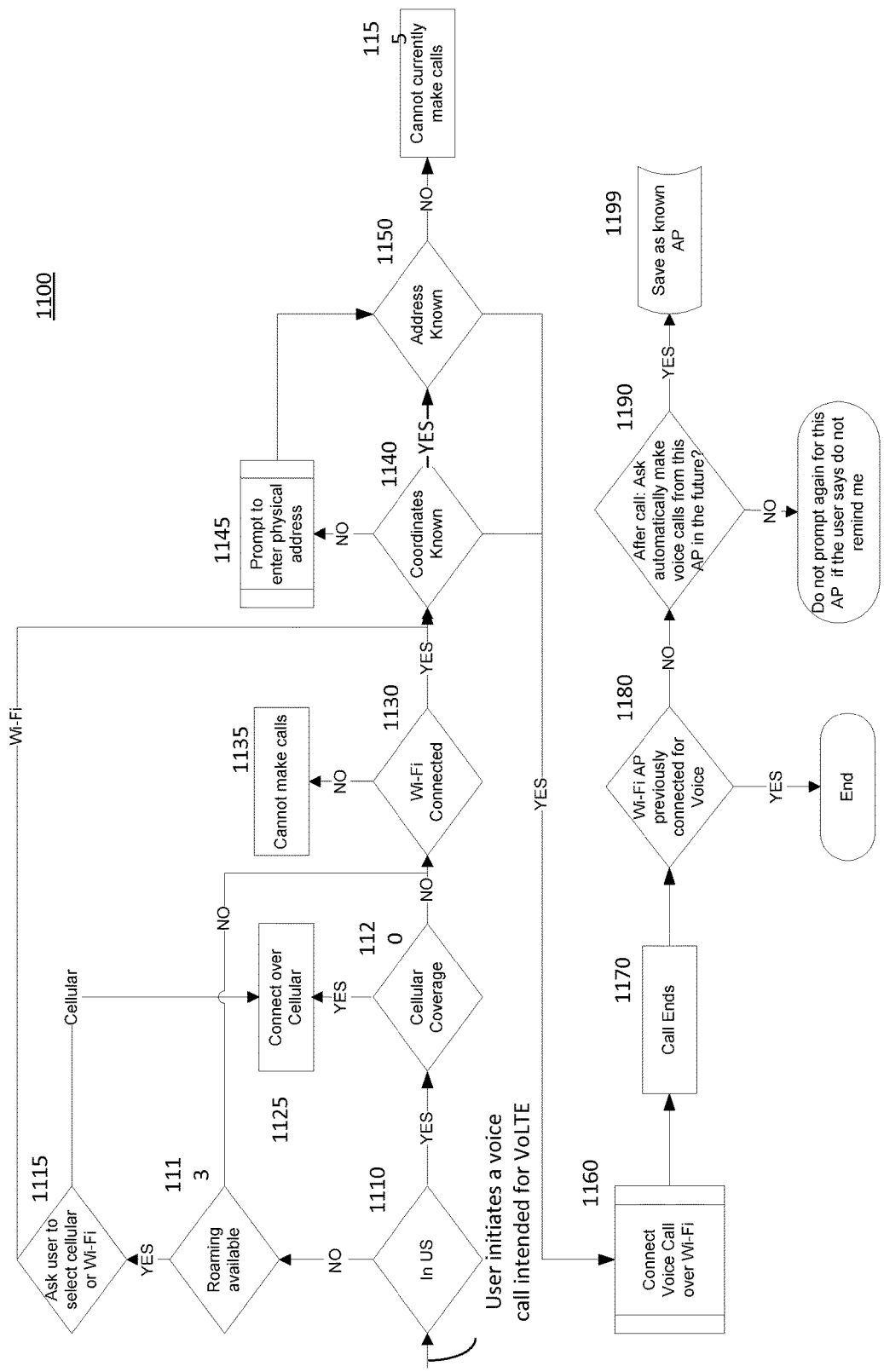
FIG. 10 illustrates a flow chart of an example of video call logic for performing a cellular carrier grade video call over an alternate radio access network.

FIG. 10 illustrates a flow chart of an example of video call process logic for performing a cellular carrier (i.e., MNO) grade video call over an alternate radio access network. Cellular carrier grade video call meaning a video call that satisfies quality of service requirements for a video call placed by a subscriber (i.e., user of mobile device 105 or 505) of the cellular carrier or MNO. Mobile devices such as 105 and 505 may be configured to perform voice calls over radio access networks, such as a Wi-Fi network instead of a cellular communication or mobile communications network. In some examples, the mobile device may connect to a Wi-Fi access point if the access point is available and does not require a security code to be input to access the Wi-Fi access point, such as WAP 103 and/or 503. Alternatively, the security code has been stored, for example, on the device based on previous connection to the secured access point. In another example, the MNO (i.e., cellular carrier) when providing a capability to connect a voice call through the MNO's network usually complies with emergency response regulations for the MNO by storing a physical location (e.g., street address, building floor or the like) of the access point.

The process 1100 begins with a user initiating a request for conducting a voice call that is intended to utilize VoLTE protocols. A first determination in the process 1100 is at 1110 at which a determination is made whether the caller is in the subscriber's home country. In this example, the subscriber's home country is the United States. If the response is "No," the process 1100 proceeds to 1113. At 1113, a determination is made whether roaming is available to the user's mobile device. If roaming is available, which means that the mobile device in the example has access to a cellular network, the process 1100 proceeds to 1115. At 1115, a prompt is generated on the mobile device, and the user is presented with the prompt that offers the user the choice of either using the cellular network or a radio access network to complete a voice call. Of course, the voice call may transition into a video call according to the examples discussed herein.

Based on the user response to the prompt at 1115, the user is either connected to the cellular network at 1125 or the process 1100 proceeds to steps to complete a connection to the radio access network (i.e., Wi-Fi) at 1140.

Returning to step 1110, if the response at 1110 is "Yes," the mobile device is in the US, the process 1100 proceeds to 1120. At 1120, a determination is made by the mobile device whether the mobile device has cellular coverage (i.e., access to a cellular network). If the mobile device has cellular coverage, the process 1100 proceeds to 1125 and the mobile device connects over the cellular network to complete the voice call. However, if the determination at 1120 is that cellular coverage is not available, the process 1100 proceeds to 1130. The determination at 1130 is performed based on a determination that either cellular coverage is unavailable in the US, for example, the mobile device is in a basement or in a rural area, and, if the mobile device is not in the US and (as in step 1113) roaming is unavailable for the mobile device. At step 1130, a determination is made whether the mobile device is connected to a Wi-Fi access point. If the mobile device is not connected to a Wi-Fi access point, the process 1100 proceeds to 1135 and a prompt is presented that the mobile device is unable to make a call at this time. Alternatively, if the mobile device is connected to a Wi-Fi access point, the process 1100 proceeds to 1140. At 1140, a determination is made whether the coordinates of the Wi-Fi access point are known. The coordinates of the Wi-Fi access point may be provided by the Wi-Fi access point, for example, during the mobile device's connection to the access point (e.g., at time of connecting or after providing additional information to the access point). The mobile device may be configured to store such location information, if provided by the access point, or the mobile device may query a network device to confirm the access point location information. For example, the mobile device may send access point information, such as an access point identifier, name, media access code (MAC) address or the like, to the network device. If the coordinates of the access point are known by either the mobile device or the network, the process 1100 proceeds to determine if the coordinates correspond to a known street address or physical location address at 1150. However, if the coordinates of the access point are unknown by either the mobile device or the network, the process 1100 proceeds to 1145, where a user is presented with a prompt on the mobile device to enter information related to a physical address (i.e., a street address or the like). Upon entering the physical address information at 1145, the physical address information is determined to be an address known (at 1150) to either the mobile device or the network. If the determination at 1150 is that the address is unknown to either the mobile device or the network, the user is provided with an error message indicating that the mobile device cannot currently make calls (1155). Alternatively, if the address is known, the mobile device is able to make calls, and the mobile device is permitted to make a voice call over Wi-Fi (1160). After completion of the call, the mobile device, the network or both may make a determination of whether the mobile device has completed a voice call via the Wi-Fi access point previously (1180). If the response to the determination is "Yes," the process 1100 ends. However, the determination is "NO," the access point was not previously used, the user (at 1190) is presented with a prompt from the mobile device requesting whether the user would like to use the access point to make voice calls in the future. If the user responds to the prompt indicating that "Yes" the user would like to make future calls from the access point, the access point (AP) is saved as a known AP (1199). However, if the user responds with an input indicating "NO, do not make future calls from the AP," then the user will not be prompted to add the AP as a known AP in the future.

In examples, in which the above Wi-Fi process is provided by a cellular carrier or MNO, the need for a known address stems from requirements for providing emergency telephone (i.e., 911) service to the carrier's mobile device subscribers or users of the carrier's network. Also, note that once a voice call is established a video call may be initiated by the mobile device user. In another example, the voice call may be initiated as a video call.

The above discussion refers to features of a mobile device that are used to initiate and maintain a voice and/or a video call. At this time it may be appropriate to discuss an example of a mobile device suitable for use in the above described video calling service.

Figure 11:
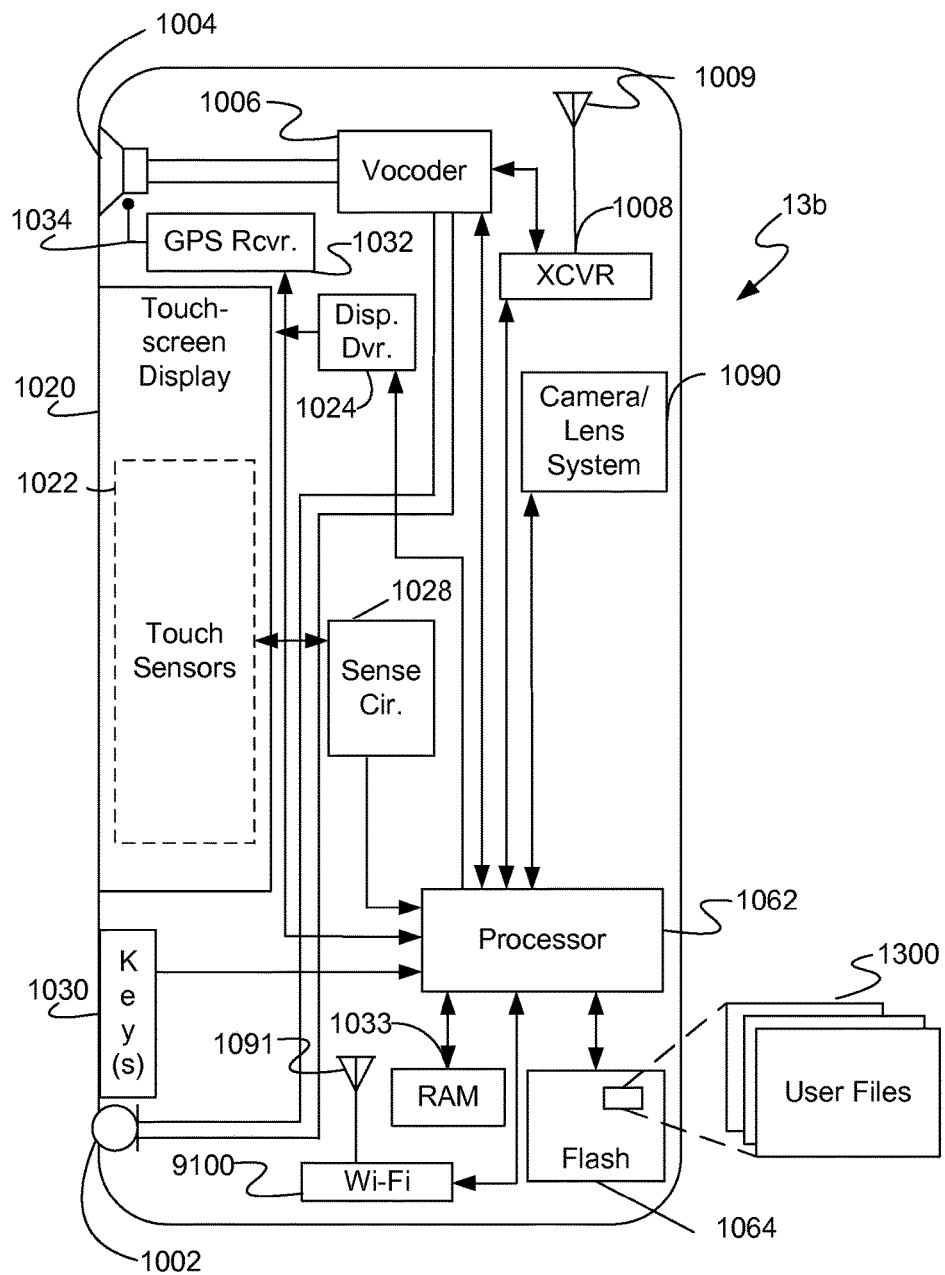
FIG. 11 is a high-level functional block diagram of an example of a touch screen type mobile station as may utilize the video calling service through a network/system like that shown in FIG. 1.

FIG. 11 provides a block diagram illustration of an example of touch-screen type mobile device 13b. Although the mobile device 13b may be a tablet or may be incorporated into another device, such as a personal digital assistant (PDA) or the like, for discussion purposes, the illustration shows the mobile device 13b is in the form of a handheld smartphone. The mobile device 13b functions as a normal digital wireless telephone device. For that function, the device 13a includes a microphone 1002 for audio signal input and a speaker 1004 for audio signal output. The microphone 1002 and speaker 1004 connect to voice coding and decoding circuitry (vocoder) 1006. For a voice telephone call, for example, the vocoder 1006 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13b also includes at least one digital transceiver (XCVR) 1008. Today, the handset 13b is configured for digital wireless communications using one or more of the common network technology types. In an example, the XCVR 1008 is configured as a transceiver suitable for voice and video calling over a long term evolution (LTE) network according to any standards or requirements related to VoLTE. The concepts discussed here encompass embodiments of the mobile device 13b utilizing any digital transceivers that conform to current or future developed digital wireless communication standards. The mobile device 13b may also be capable of analog operation via a legacy network technology.

The transceiver 1008 provides two-way wireless communication of information, such as vocoded speech samples and/or digital information for data communications (including for authentication), in accordance with the technology of the networks of FIG. 1. The transceiver 1008 also sends and receives a variety of signaling messages in support of the various voice and data services provided via the mobile device 13b and the communication network. Each transceiver 1008 connects through RF send and receive amplifiers (not separately shown) to an antenna 1009.

The mobile device 13b includes a display 1020 for displaying messages, menus or the like, call related information dialed by the user, calling party numbers, etc., including the described for the mobile device video calling upgrade service. Keys 1030 or a virtual keyboard presented via the touch-screen display 1020 may enable dialing digits for voice and/or data calls as well as generating selection inputs, for example, as may be keyed-in by the user based on a displayed menu or as a cursor control and selection of a highlighted item on a displayed screen. The touch-screen display 1020 and keys 1030 are the physical elements providing a textual or graphical user interface. Various combinations of the keypad 120, touch-screen display 1020, microphone 1002 and speaker 1004 may be used as the physical input output elements of the graphical user interface (GUI), for multimedia (e.g., audio and/or video) communications including communications/interactions related to voice and/or video calling. Of course other user interface elements may be used, such as a trackball, as in some types of PDAs or smart phones.

In addition to normal telephone and data communication related input/output, the user interface elements also may be used for display of menus and other information to the user and user input of selections, including any needed during user selection of a menu option. For example, if used as a selection device, the user interface elements allow a user to select the different video calling functional inputs.

A microprocessor 1062 serves as a programmable controller for the mobile device 13*b*, in that it controls all operations of the mobile device 13*b* in accord with programming that it executes, for all normal operations, and for operations involved in the mobile application voice and/or video calling service under consideration here. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 1062, for example, may be based on any known or available microprocessor architecture, such as a Reduced Instruction Set Computing (RISC) using an ARM architecture, as commonly used today in mobile devices and other portable electronic devices. Of course, other microprocessor circuitry may be used to form the CPU or processor hardware in server computers or other user terminal computer equipment.

Returning more specifically to the mobile device example of FIG. 10, the microprocessor 1062 serves as the programmable host for mobile device 13*b* by configuring the mobile device 13*b* to perform various operations, for example, in accordance with instructions or programming executable by microprocessor 1062. For example, such operations may include various general operations of the mobile device 13*b* as well as operations related to confirming or adjusting operational settings of the mobile device 13*b*, contacting network devices, storing user preference information, controlling encoding/decoding of voice and video data, and the like. Although a processor may be configured by use of hardwired logic, typical processors in mobile devices are general processing circuits configured by execution of programming. The microprocessor 1062 connects to other elements of the mobile device 13*b* via appropriate circuitry, such as bus or terminal connections. In a present example, the mobile device 13*b* includes flash type program memory 1064, for storage of various "software" or "firmware" program routines such as device operating system (OS), voice encoding/decoding algorithms, video encoding/decoding algorithms, programs related to graphical user interface elements and functions. The memory 1064 also stores mobile configuration settings, such as the MDN, the IMEID and/or mobile identification number (MIN), etc. The mobile device 13*b* may also include a non-volatile random access memory (RAM) 1033 for a working data processing memory. Of course, other storage devices or configurations may be added to or substituted for those in the example. The memories 1064, 1033 also store various data, such as telephone numbers and server addresses, downloaded data such as multimedia content, and various data input by the user. Programming stored in the flash type program memory 1064, sometimes referred to as "firmware," is loaded into and executed by the microprocessor 1062.

As outlined above, the mobile device 13*b* includes a processor, and programming, such as mobile application(s) 1030, stored in the flash memory 1064 configures the processor so that the mobile device is capable of performing various desired functions, including in this case the functions involved in the technique for providing video calling services. User files 1300 discussed above with respect to FIG. 7 may be stored in flash memory 1064.

The logic implemented by the processor 1062 of the mobile device 13*b* configures the processor 1062 to control various functions as implemented by the mobile device 13*b*. The logic for a processor 1062 may be implemented in a variety of ways, but in our example, the processor logic is implemented by programming for execution by the processor 1062. Regular operations of the device are controlled by operation of the processor 1062.

For purposes of such a discussion, FIG. 10 provides a block diagram illustration of an example of a touch screen type mobile device 13*b* having a touch screen display for displaying content and receiving user input as (or as part of) the user interface. For a voice telephone call, for example, the vocoder 1006 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including inputs for authentication communications. Increasingly, tablets and other types of mobile devices include similar elements to support audio and visual communication. A mobile device 13*b* may include a variety of different types of user interface elements. For output purposes, the touch screen 1020 includes a display screen, such as a liquid crystal display (LCD) or the like. For input purposes, touch screen display 1020 includes a plurality of touch sensors 1022. Other interface elements may include a keypad including one or more keys 1030. For example, the keypad may be implemented in hardware as a T9 or QWERTY keyboard of mobile device 13*b* and keys 1030 may correspond to the physical keys of such a keyboard. Alternatively, keys 1030 (and keyboard) of mobile device 13 may be implemented as "soft keys" of a virtual keyboard graphically represented in an appropriate arrangement via touch screen display 1020. The soft keys presented on the touch screen display 1020 may allow the user of mobile device 13*b* to invoke the same user interface functions as with the physical hardware keys. In some implementations, the microphone 1002 and speaker 1004 may be used as additional user interface elements, for audio input and output, including with respect to some functions related to the video calling processing and communication, as described herein. The different user interface elements may be used to navigate through the examples of video calling service graphical user interfaces described herein.

For output, touch screen display 1020 is used to present information (e.g., text, video, graphics or other visible digital media content) to the user of mobile device 13*b*. Processor 1062 controls visible display output on the LCD or other display element of the touch screen display 1020 via a display driver 1024, to present the various visible outputs to the device user.

In general, touch screen display 1020 and touch sensors 1022 (and one or more keys 1030, if included) are used to provide the textual and graphical user interface for the mobile device 13*b*. In an example, touch screen display 1020 provides viewable content to the user at mobile device 13*b*. Touch screen display 1020 also enables the user to interact directly with the viewable content provided in the content display area, typically by touching the surface of the screen with a finger or an implement such as a stylus.

As shown in FIG. 11, the mobile device 13*b* also includes a sense circuit 1028 coupled to touch sensors 1022 for detecting the occurrence and relative location/position of each touch with respect to a content display area of touch screen display 1020. In addition, the sense circuit 1028 is configured to provide processor 1062 with touch-position information based on user input received via touch sensors 1022 (e.g. a user interface element). In some implementations, processor 1062 is configured to correlate the touch position information to specific content being displayed within the content display area on touch screen display 1020. The touch-position information captured by sense circuit 1028 and provided to processor 1062 may include, but is not limited to, coordinates identifying the location of each detected touch with respect to the display area of touch screen display 1020 and a timestamp corresponding to each detected touch position.

Additional features of mobile device 13*b* include, for example, camera/lens system 1090 may include two cameras: a first camera facing the user of the mobile device 13*b* and a second camera on the backside of the mobile device 13*b* for generating a real time stream of video of a live scene that is to the processor 1062 for either delivery to a second mobile device (e.g., mobile device 505 of FIG. 1) and/or for presentation on the display device (i.e. touch-screen display 1020) of the mobile device 13*b*.

There is a variety of ways that a mobile device 13 may be configured to obtain information with respect to current location of the device. In our example, the mobile device 13 includes a global positioning satellite (GPS) receiver 1032 and associated antenna 1034.

The logic implemented by the processor 1062 of the mobile device 13 configures the processor 1062 to control various functions as implemented by the mobile device 13. The logic for a processor may be implemented in a variety of ways, but in our example, the processor logic is implemented by programming for execution by the processor 1062. Regular operations of the device are controlled by operation of the processor 1062.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a memory storing instructions;
   a processor to execute the instructions to:
      determine whether the mobile device and another mobile device have previously participated in a video stream;
      determine that the other mobile device is capable of receiving another video stream based on determining that the mobile device and the other mobile device have previously participated in the video stream;
      query, based on determining that the other mobile device is capable of receiving another video stream, a network component to determine whether the other mobile device is in a network coverage area;

query the network component to determine whether the other mobile device has a call setting turned on;

provide, for display, a one-way video control option based on determining that the other mobile device is in the network coverage area and has the call setting turned on;

turn on a camera during a voice call based on a selection of the one-way video control option;

generate a real time video stream of a live scene in a field of view of the camera based on turning on the camera;

provide, for display, the real time video stream in a display portion of the mobile device;

provide, for display, a thumbnail image with an identifier associated with a user of the other mobile device;

determine whether the other mobile device accepts a video request; and forward the real time video stream to the other mobile device based on determining that the other mobile device accepts the video request.

2. The mobile device of claim 1, where the processor is further to:

send, to the other mobile device, a request to confirm that the real time video stream is to be forwarded to the other mobile device;

provide, for display, a status indicator of the request;

receive, from the other mobile device, a confirmation to forward the real time video stream to the other mobile device; and remove, from the display, the status indicator, based on receiving the confirmation to forward the real time video stream.

3. The mobile device of claim 1, where the processor is further to:

receive, from a different mobile device during a subsequent voice call, a request for confirmation that video generated by the different mobile device is to be forwarded to the mobile device;

provide, for display and selection, a first prompt, based on receiving the request, to upgrade the subsequent voice call to allow the video, generated by the different mobile device, to be provided for display on the mobile device; and provide, for display and selection, a second prompt for choosing to remain in the subsequent voice call.

4. The mobile device of claim 3, where the processor is further to:

provide, for display, the video generated by the different mobile device based on a selection of the first prompt; and maintain the subsequent voice call between the mobile device and the different mobile device.

5. The mobile device of claim 3, where the processor is further to:

send, to the different mobile device, a denial message based on a selection of the second prompt; and maintain the subsequent voice call between the mobile device and the different mobile device.

6. The mobile device of claim 1, where the processor, when forwarding the real time video stream, is to:

forward the real time video stream via a radio frequency transceiver configured as a long term evolution standard transceiver suitable for voice and video calling.

7. The mobile device of claim 1, where the processor is further to:

determine when a mobile communication network is unavailable, determine whether a wireless access point of a radio access network different from the mobile communication network has a known physical address; and connect a voice call from the mobile device to the other mobile device via a radio access network transceiver communicatively coupled to the radio access network based on the wireless access point being determined to have the known physical address.

8. A method, comprising:

determining, by a mobile device, whether the mobile device and another mobile device have previously participated in a video stream;

determining, by the mobile device, that the other mobile device is capable of receiving another video stream based on determining that the mobile device and the other mobile device have previously participated in the video stream;

querying, by the mobile device and based on determining that the other mobile device is capable of receiving another video stream, a network component to determine whether the other mobile device is in a network coverage area;

querying, by the mobile device, the network component to determine whether the other mobile device has a call setting turned on;

providing, by the mobile device and for display, a one-way video control option based on determining that the other mobile device is in the network coverage area and has the call setting turned on;

receiving, by the mobile device, a selection based on providing, for display, the one-way video control option;

turning on, by the mobile device, a camera associated with the mobile device during a voice call based on the selection of the one-way video control option;

generating, by the mobile device, a real time video stream of a live scene in a field of view of the camera based on turning on the camera;

providing, by the mobile device and for display, the real time video stream;

providing, by the mobile device and for display, a thumbnail image with an identifier associated with a user of the other mobile device;

determining, by the mobile device, whether the other mobile device accepts a video request; and forwarding, by the mobile device, the real time video stream to the other mobile device based on determining that the other mobile device accepts the video request.

9. The method of claim 8, further comprising:

sending, to the other mobile device, a request to confirm that the real time video stream is to be forwarded to the other mobile device;

providing, for display, a status indicator of the request;

receiving, from the other mobile device, a confirmation to forward the real time video stream to the other mobile device; and removing, from the display, the status indicator based on receiving the confirmation to forward the real time video stream.

10. The method of claim 8, further comprising:

receiving, from a different mobile device during a subsequent voice call, a request for confirmation that video generated by the different mobile device is to be forwarded to the mobile device;

providing, for display and selection, a first prompt, based on receiving the request, to upgrade the subsequent voice call to allow the video, generated by the different mobile device, to be provided for display on the mobile device; and providing, for display and selection, a second prompt for choosing to remain in the subsequent voice call.

11. The method of claim 10, further comprising:
providing, for display, the video generated by the different mobile device based on a selection of the first prompt; and
maintaining the subsequent voice call between the mobile device and the different mobile device.

12. The method of claim 10, further comprising:
sending, to the different mobile device, a denial message based on a selection of the second prompt; and
maintaining the subsequent voice call between the mobile device and the different mobile device.

13. The method of claim 8, where forwarding the real time video stream comprises:
forwarding the real time video stream via a radio frequency transceiver configured as a long term evolution standard transceiver suitable for voice and video calling.

14. The method of claim 8, further comprising:
determining when a mobile communication network is unavailable,
determining whether a wireless point of a radio access network different from the mobile communication network has a known physical address; and
connecting a voice call from the mobile device to the other mobile device, via a radio access network transceiver communicatively coupled to the radio access network, based on the wireless access point being determined to have the known physical address.

15. A non-transitory computer-readable medium storing instructions, the instructions comprising:
one or more instructions that, when executed by one or more processors, cause the one or more processors to:
determine whether a mobile device and another mobile device have previously participated in a video stream;
determine that the other mobile device is capable of receiving another video stream based on determining that the mobile device and the other mobile device have previously participated in the video stream;
query, based on determining that the other mobile device is capable of receiving another video stream, a network component to determine whether the other mobile device is in a network coverage area;
query the network component to determine whether the other mobile device has a call setting turned on;
provide, for display, a one-way video control option based on determining that the other mobile device is in the network coverage area and has the call setting turned on;
receive a selection based on providing the one-way video control option;
turn on a camera during a voice call based on the selection of the one-way video control option;
generate a real time video stream of a live scene in a field of view of the camera based on turning on the camera;
provide, for display, the real time video stream;
provide, for display, a thumbnail image with an identifier associated with a user of the other mobile device;

determine whether the other mobile device accepts a video request; and
forward the real time video stream to the other mobile device based on determining that the other mobile device accepts the video request.

16. The non-transitory computer-readable medium of claim 15, where the one or more instructions, when executed by the one or more processors, further cause the one or more processors to:
send, to the other mobile device, a request to confirm that the real time video stream is to be forwarded to the other mobile device;
provide, for display, a status indicator of the request;
receive, from the other mobile device, a confirmation to forward the real time video stream to the other mobile device; and
remove, from the display, the status indicator based on receiving the confirmation.

17. The non-transitory computer-readable medium of claim 15, where the one or more instructions, when executed by the one or more processors, further cause the one or more processors to:
receive, from a different mobile device during a subsequent voice call, a request for confirmation that video, generated by the different mobile device, is to be forwarded to the mobile device;
provide, for display and selection, a first prompt, based on receiving the request, to upgrade the subsequent voice call to allow the video, generated by the different mobile device, to be provided for display on the mobile device; and
provide, for display and selection, a second prompt for choosing to remain in the subsequent voice call.

18. The non-transitory computer-readable medium of claim 17, where the one or more instructions, when executed by the one or more processors, further cause the one or more processors to:
provide, for display, the video generated by the different mobile device based on a selection of the first prompt; and
maintain the subsequent voice call between the mobile device and the different mobile device.

19. The non-transitory computer-readable medium of claim 17, where the one or more instructions, when executed by the one or more processors, further cause the one or more processors to:
send, to the different mobile device, a denial message based on a selection of the second prompt; and
maintain the subsequent voice call between the mobile device and the different mobile device.

20. The non-transitory computer-readable medium of claim 15, where the one or more instructions, when executed by the one or more processors, further cause the one or more processors to:
determine when a mobile communication network is unavailable,
determine whether a wireless access point of a radio access network, different from the mobile communication network, has a known physical address; and
connect a voice call from the mobile device to the other mobile device, via a radio access network transceiver communicatively coupled to the radio access network, based on the wireless access point being determined to have the known physical address.

* * * * *